(12) United States Patent
     Skaaksrud

(10) Patent No.: US 9,208,621 B1
(45) Date of Patent: Dec. 8, 2015

(54) METHODS AND SYSTEMS FOR DETECTING A PACKAGE TYPE USING AN IMAGING LOGISTICS RECEPTACLE

(71) Applicant: Ole-Petter Skaaksrud, Germantown, TN (US)

(72) Inventor: Ole-Petter Skaaksrud, Germantown, TN (US)

(73) Assignee: FEDEX CORPORATE SERVICES, INC., Memphis, TN (US)

( * ) Notice: Subject to any disclaimer, the term of this patent is extended or adjusted under 35 U.S.C. 154(b) by 55 days.

(21) Appl. No.: 14/282,038

(22) Filed: May 20, 2014

(51) Int. Cl.
    *G07B 17/00* (2006.01)
    *G06K 9/00* (2006.01)
    *G06Q 10/08* (2012.01)

(52) U.S. Cl.
    CPC ............ *G07B 17/00661* (2013.01); *G06K 9/00* (2013.01); *G06K 9/00577* (2013.01); *G06Q 10/08* (2013.01)

(58) Field of Classification Search
    CPC ............... G07B 17/00661; G06K 9/00; G06K 9/00577; G06Q 10/08
    See application file for complete search history.

(56) References Cited

U.S. PATENT DOCUMENTS

| 8,669,486 B2 * | 3/2014 | Ward | B07C 3/02 209/584 |
| 2005/0097021 A1 * | 5/2005 | Behr | G01N 21/85 705/36 R |
| 2012/0004761 A1 * | 1/2012 | Madruga | G06Q 30/02 700/214 |
| 2013/0318931 A1 * | 12/2013 | Holmes | B65B 1/02 53/562 |
| 2014/0207600 A1 * | 7/2014 | Ezell | G07F 7/06 705/26.1 |
| 2014/0258168 A1 * | 9/2014 | Crawford | E05G 7/00 705/339 |

FOREIGN PATENT DOCUMENTS

EP          1306813 A2 *  2/2003  ............. G07B 17/00

* cited by examiner

*Primary Examiner* — Tom Y Lu
(74) *Attorney, Agent, or Firm* — Withers & Keys, LLC

(57) ABSTRACT

Methods and systems that detect a package type of a package deposited within a logistics receptacle having an entrance chute that receives the package, an image sensor within the entrance chute, and an interaction sensor. The interaction sensor detects when the package is provided to the receptacle. After detection, the image sensor is activated to capture an image corresponding to at least a part of one side of the package. The image is processed to determine a pattern match related to the package type, and the package's type is identified based upon the determined pattern match. The system may also include a dispatch type of server notified with a pickup request from the receptacle. The server may update analytics information related to the receptacle, determine a future pickup schedule for the receptacle based upon the updated analytics information, and transmit a schedule update message based upon the future schedule.

52 Claims, 13 Drawing Sheets

METHODS AND SYSTEMS FOR DETECTING A PACKAGE TYPE USING AN IMAGING LOGISTICS RECEPTACLE

FIELD OF THE DISCLOSURE

The present disclosure generally relates to systems, apparatus and methods in the field of logistics and, more particularly, to various aspects involving systems, apparatus and methods for detecting a package type of a package deposited within a logistics receptacle.

BACKGROUND

For a logistics operation that receives, ships, and delivers packages, it is common to deploy one or more receptacles or repositories that accept such packages for shipment. For example, such a receptacle or repository (generally referred to as a logistics receptacle) may come in the form of a drop box, which allows a customer to securely deposit a package to be shipped within it but not provide customer access to an interior holding area of the drop box. Another example may be a locker unit type of receptacle, which provides the customer with secure access to the interior holding area of the receptacle along with the service courier picking up any packages within the holding area. As such, a logistics receptacle is often an entry point for a package being shipped from one location to another.

In some situations, a logistics receptacle may be privately deployed and managed by dedicated or part-time shipment personnel (e.g., a shipment bin that collects packages to be shipped in a mail room or shipping office). In this situation, the personnel usually interact with the shipping customer to determine different types of packages, which may be associated with different types of service couriers or pickup entities.

In other situations, a logistics receptacle may be publicly deployed. For example, a logistics operation may deploy multiple logistics receptacles (e.g., drop boxes) at different geographic locations so that the public may be able to more conveniently drop off packages to be shipped (by the logistics operation) rather than travel to a central shipping office or shipping center. As such, many publicly deployed logistics receptacles are not actively manned by personnel. Thus, publicly deployed logistics receptacles are often used as secure repositories for packages and are only periodically serviced by a pickup entity, such as a courier service.

Some logistics receptacles may be serviced by only one pickup entity or courier service, but other logistics receptacles may be serviced by more than one entity or more than one type of courier service. For example, FedEx Corporation has a network of approximately 43,000 drop boxes that are serviced by the FedEx Express® service, which provides time-definite shipping (e.g., FedEx SameDay, FedEx Priority Overnight). If a FedEx drop box would be serviced by another entity or courier service (e.g., FedEx Ground that provides cost-effective, day-definite shipping for small packages; or FedEx Home Delivery® that focuses on residential deliveries), the potential servicing by more than one entity introduces difficulties in operational planning and efficiency.

For instance, when a particular logistics receptacle is only serviced by a single pickup entity, the pickup schedule may be easy to set and efficiently manage. However, when different types of packages are deposited that require service by different pickup entities, managing and setting the pickup schedule in an efficient way becomes more complicated and ripe for inefficiencies and mistakes. Thus, using a fixed schedule for two different pickup entities to service and pickup any potential packages from a given logistics receptacle may incur wasted resources when only one type of package has been deposited (i.e., the receptacle may contain only packages for one of the pickup entities but not the other, which wastes time and resources to have the other pickup entity service the receptacle).

To address these requirements, a system is needed that may robustly detect and differentiate types of packages used by different service couriers (without necessarily relying upon a scan) and, in some instances, may efficiently extend such detection information into enhanced predictive operational planning for a logistics operation.

SUMMARY

In the following description, certain aspects and embodiments will become evident. It should be understood that the aspects and embodiments, in their broadest sense, could be practiced without having one or more features of these aspects and embodiments. It should be understood that these aspects and embodiments are merely exemplary.

In the following description, certain aspects and embodiments will become evident. It should be understood that the aspects and embodiments, in their broadest sense, could be practiced without having one or more features of these aspects and embodiments. It should be understood that these aspects and embodiments are merely exemplary.

One aspect of the disclosure relates to a method for detecting a package type of a package deposited within a logistics receptacle. The logistics receptacle has at least an entrance chute that receives the package, an image sensor within the entrance chute, and an interaction sensor. The interaction sensor detects when the package is provided to the logistics receptacle. The image sensor is then activated, after detection by the interaction sensor, to capture a first package exterior image corresponding to at least a part of one side of the package. The captured first package exterior image is then processed to determine a pattern match related to the package type of the package. Based upon the pattern match, a package type for the package may be identified.

In another aspect of the disclosure, a non-transitory computer-readable medium is disclosed that contains instructions, which when executed on a processor, performs a similar method as described above for detecting a package type of a package deposited within a logistics receptacle.

In yet another aspect of the disclosure, an apparatus is disclosed for for detecting a package type of a received package. The apparatus generally comprises a logistics receptacle, an interaction sensor disposed on the logistics receptacle, at least one image sensor, and a processing module. The logistics receptacle comprises a holding area within which to maintain the package and an entrance chute (having a plurality of walls) through which the package may be deposited into the holding area. In general, the interaction sensor is disposed on the logistics receptacle and operates by generating a detection signal when the package is provided to the logistics receptacle within the entrance chute. The image sensor, which is disposed on at least one of the walls of the entrance chute, captures a first package exterior image corresponding to at least a part of one side of the package when activated. The processing module is also disposed within the logistics receptacle and comprises a processing unit coupled to each of the interaction sensor and to the image sensor, and a memory coupled to the processing unit. The memory maintains at least a set of graphic label category references respectively associated with different package types. The processing unit is adapted and operative to perform certain functions, such as receive the detection signal from the interaction sensor; activate the image sensor to cause the image sensor to capture the first package exterior image upon receipt of the detection signal; receive the captured first package exterior image from the image sensor; determine a pattern match related to the package type of the package by analyzing the captured first package exterior image compared with respective ones of the set of graphic label category references; and identify the package type for the package based upon the determined pattern match.

In still another aspect of the disclosure, a system is disclosed for detecting a package type of a received package. The system generally includes a logistics receptacle, a processing module, and a server. The logistics receptacle comprises an entrance chute, an interaction sensor, and at least one image sensor. The entrance chute has a plurality of walls and through which the package may be deposited. The interaction sensor is disposed on the logistics receptacle and operative to generate a detection signal when the package is provided to the logistics receptacle within the entrance chute. The image sensor is also disposed within the entrance chute, and upon activation, the image sensor is operative to capture a first package exterior image corresponding to at least a part of one side of the package.

The system's processing module is disposed within the logistics receptacle and further comprises a receptacle processing unit, a first memory unit, and a receptacle communication interface. The receptacle processing unit is coupled to each of the interaction sensor and to the image sensor. The first memory unit is coupled to the receptacle processing unit, and maintains at least a set of graphic label category references respectively associated with different package types. The receptacle communication interface is also coupled to the receptacle processing unit, and provides access to a network. The receptacle processing unit is adapted and operative to perform certain functions, such as receive the detection signal from the interaction sensor; activate the image sensor to cause the image sensor to capture the first package exterior image upon receipt of the detection signal; receive the captured first package exterior image from the image sensor; analyze the captured first package exterior image compared with respective ones of the set of graphic label category references to recognize a pattern match related to the package type of the package; identify the package type for the package based upon the recognized pattern match; and cause the receptacle communication interface to transmit a pickup request message over the network, the pickup request message being related to the identified package type.

The system's server further comprises a server processing unit, a server memory unit, and a server communication interface. The server memory unit is coupled to the server processing unit, and maintains at least analytics information related to the logistics receptacle. The server communication interface is also coupled to the server processing unit, and provides access to the network. The server processing unit is adapted and operative to perform certain functions, such as receive the pickup request from the server communication interface; update the analytics information related to the logistics receptacle; determine a future pickup schedule based upon the updated analytics information; and cause the server communication interface to transmit a schedule update message based upon the determined future pickup schedule.

Additional advantages of this and other aspects of the disclosed embodiments and examples will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments according to one or more principles of the invention and together with the description, serve to explain one or more principles of the invention. In the drawings.

DESCRIPTION OF THE EMBODIMENTS

Figure 1:
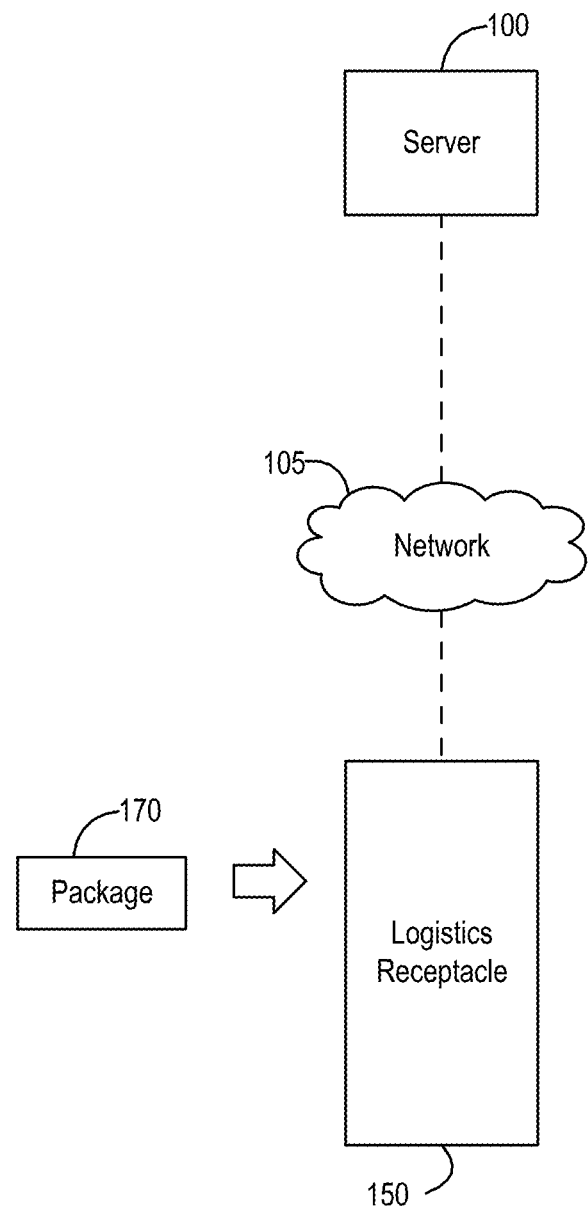
FIG. 1 is a diagram of an exemplary logistics receptacle in a communication configuration with an exemplary server in accordance with an embodiment of the invention.

Reference will now be made in detail to exemplary embodiments. Wherever possible, the same reference numbers are used in the drawings and the description to refer to the same or like parts.

In general, the following describes various embodiments having a logistics receptacle that may be improved and enhanced with one or more image sensors to detect a package type, which may relate to different service couriers that can service the logistics receptacle. The described embodiments also include an embodiment of an exemplary system that may deploy such an enhanced logistics receptacle as part of predictively determining a future pickup schedule for the logistics receptacle based upon collected and updated analytics for the logistics receptacle. The use of intelligent analytics to predict different logistics events (such as drop events) in combination with an advanced and intelligent logistics receptacle may be advantageously useful for enhancing logistical operation planning.

Figure 4:
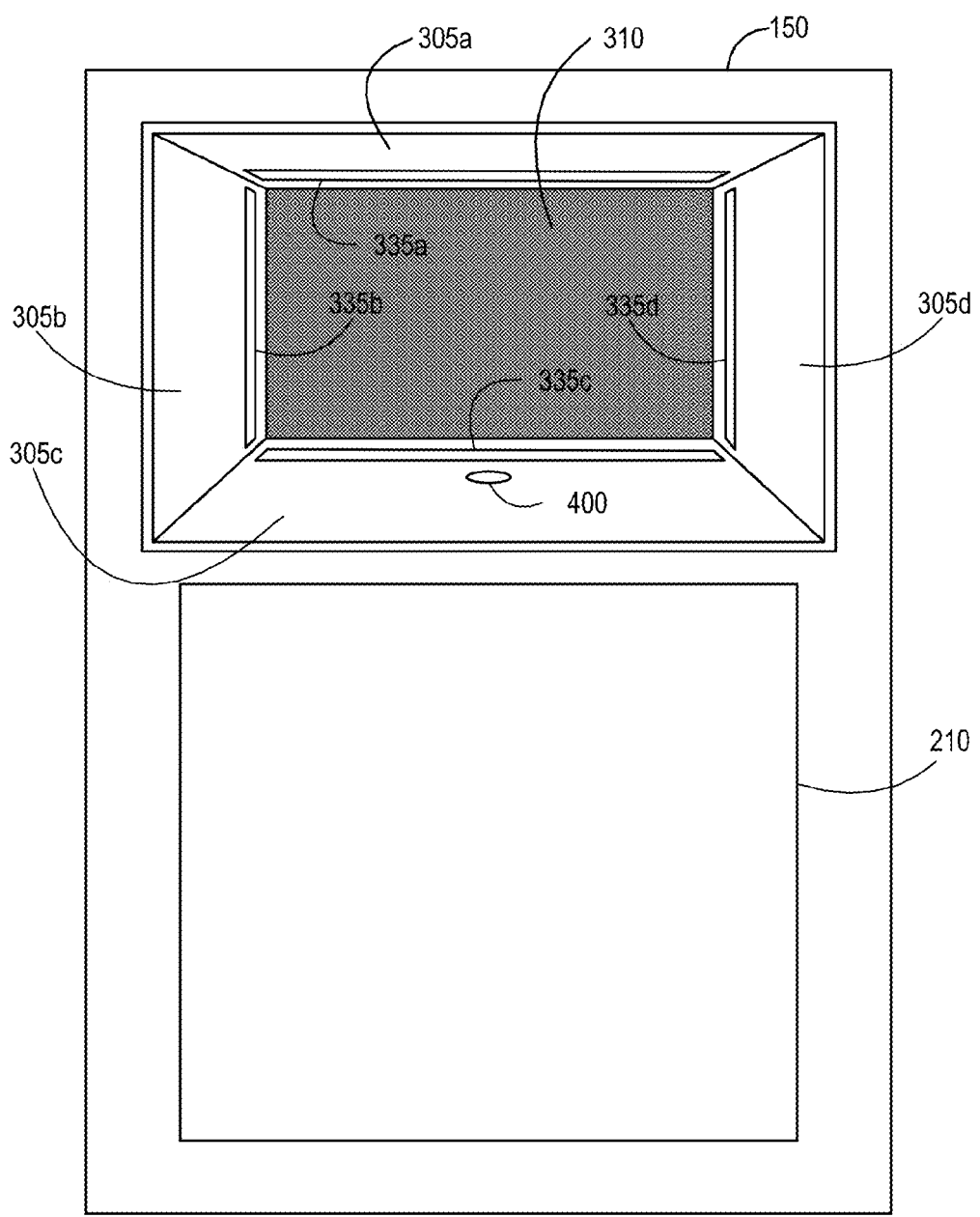
FIG. 4 is a perspective diagram illustrating the interior walls of an entrance chute of the exemplary logistics receptacle shown in FIG. 2 in accordance with an embodiment of the invention.
Figure 5A:
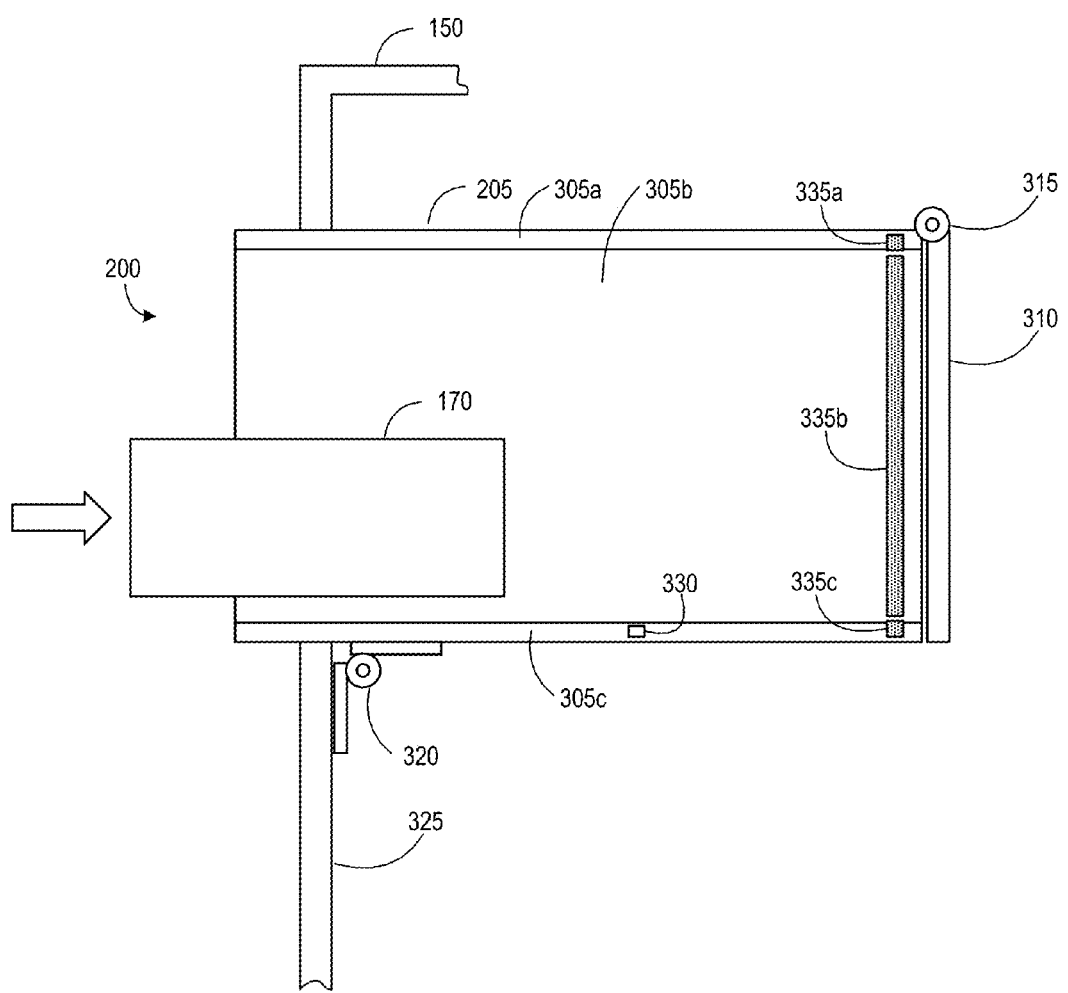
FIGS. 5A-C are a series of diagrams illustrating operation of the exemplary entrance chute as a package is provided to, received by, and deposited within the exemplary logistics receptacle in accordance with an embodiment of the invention.
Figure 5B:
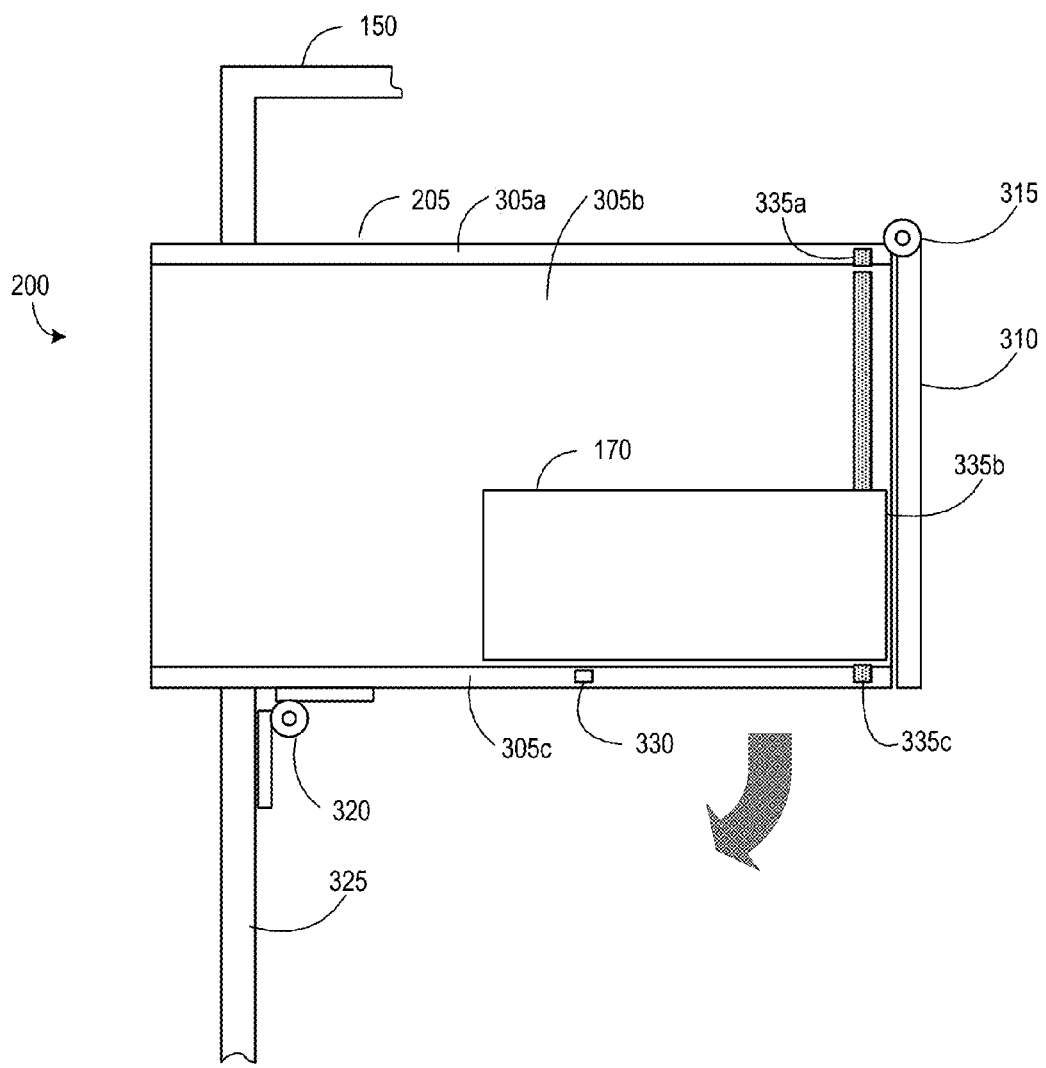
Figure 6:
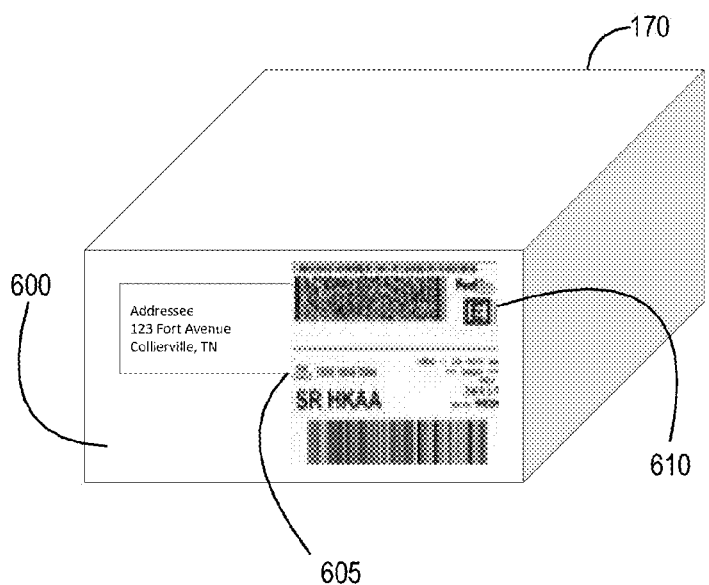
FIG. 6 is a perspective diagram illustrating an exemplary package and an exemplary label on a surface of the package in accordance with an embodiment.
Figure 7A:
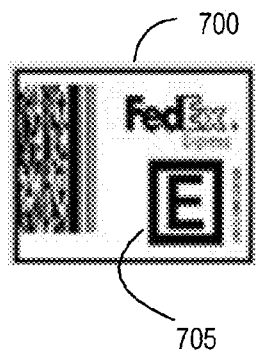
FIGS. 7A-B are respective illustrations of part of an image captured of the exemplary label of FIG. 6 at different degrees of clarity corresponding to different distances from an exemplary image sensor in accordance with an embodiment of the invention.
Figure 7B:
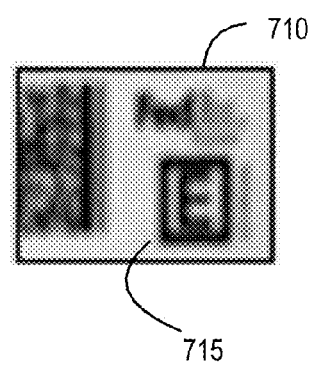
Figure 8:
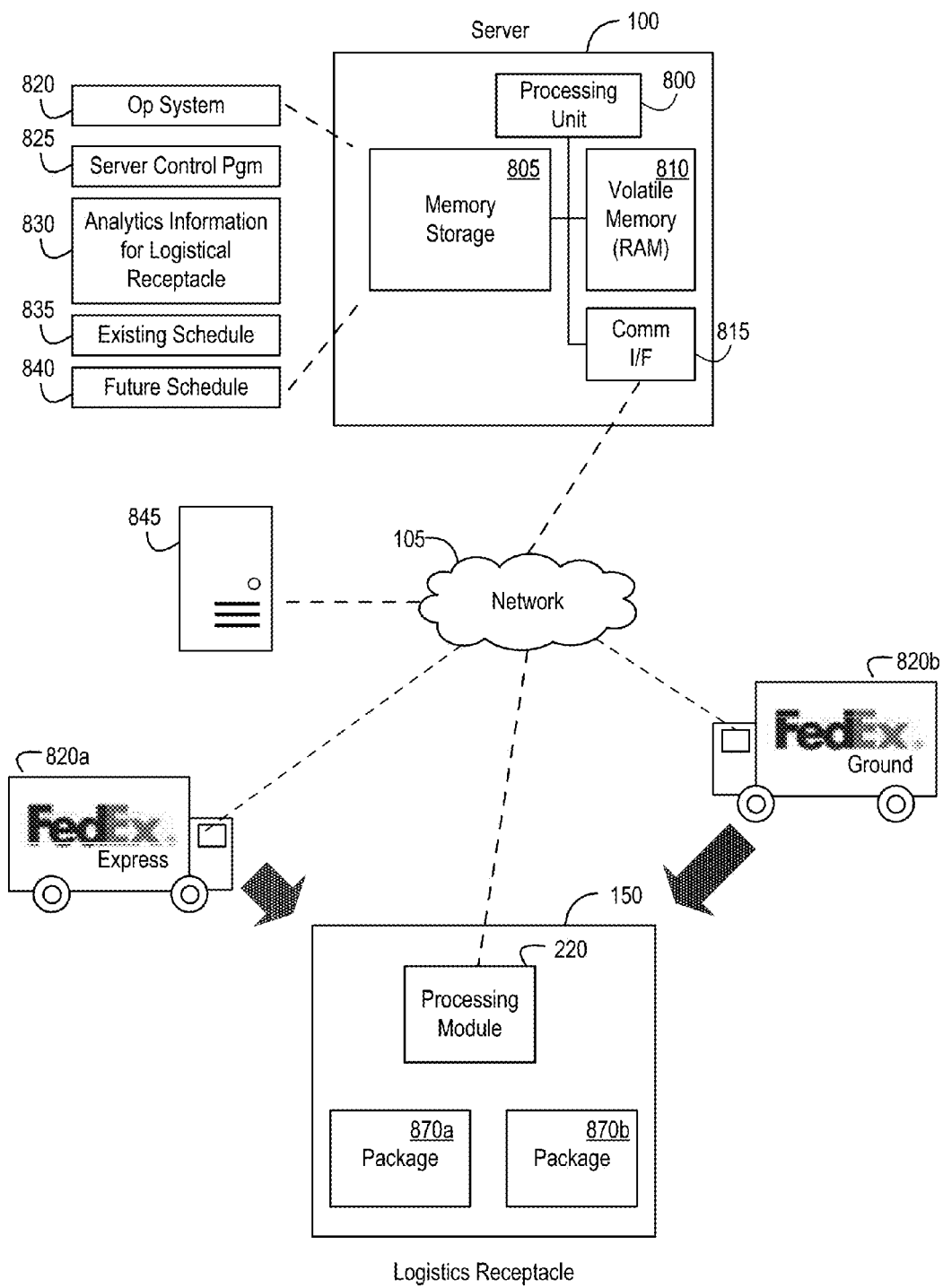
FIG. 8 is a detailed block diagram illustrating components of an exemplary system having an exemplary logistics receptacle for detecting and reporting a package type and an exemplary server for determining a future pickup schedule based upon updated analytics information related to the logistics receptacle in accordance with an embodiment of the invention.
Figure 9:
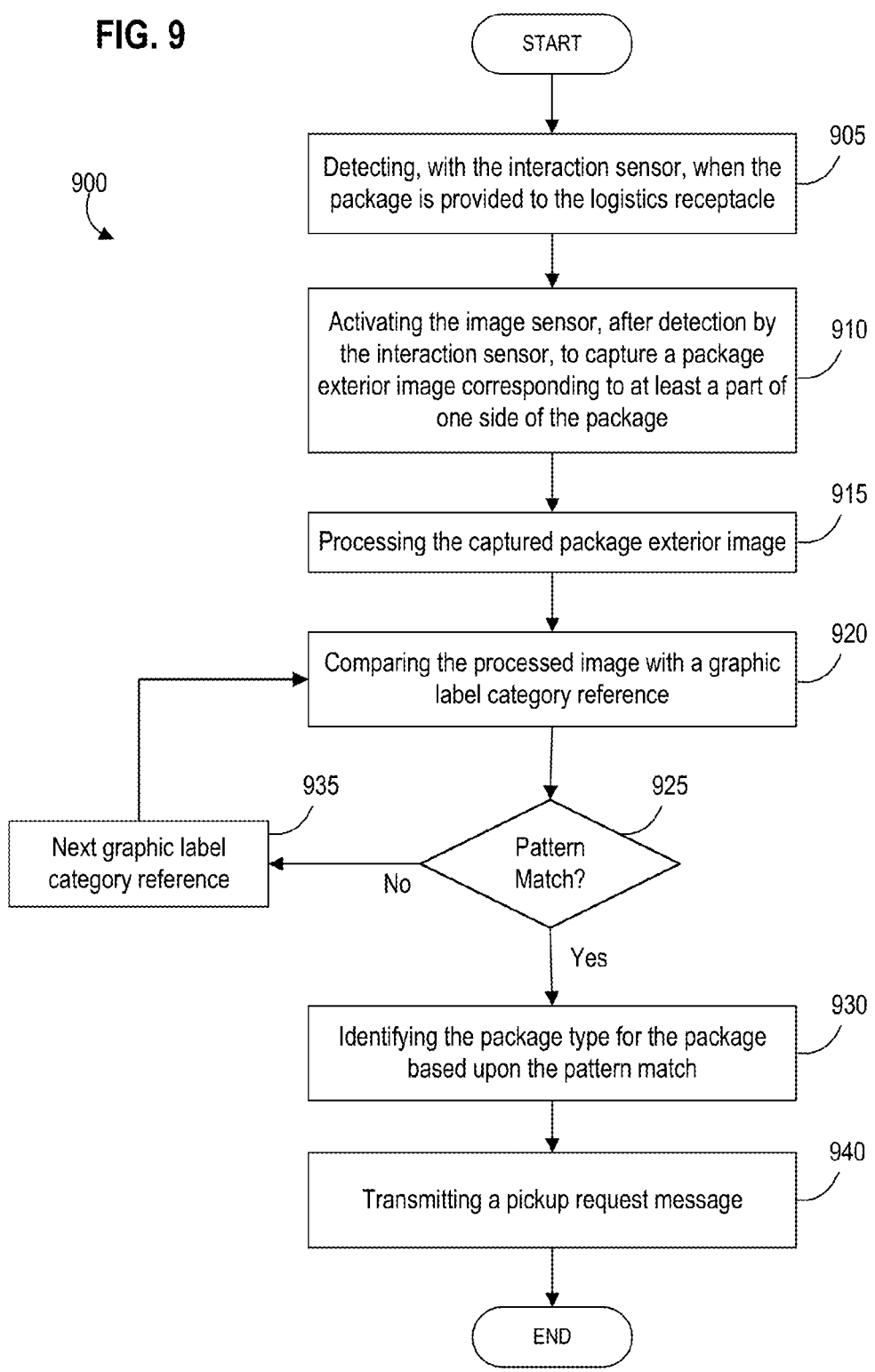
FIG. 9 is a flow diagram illustrating an exemplary method, performed by components within a logistics receptacle, for detecting a package type of a package deposited within the logistics receptacle in accordance with an embodiment of the invention.
Figure 10:
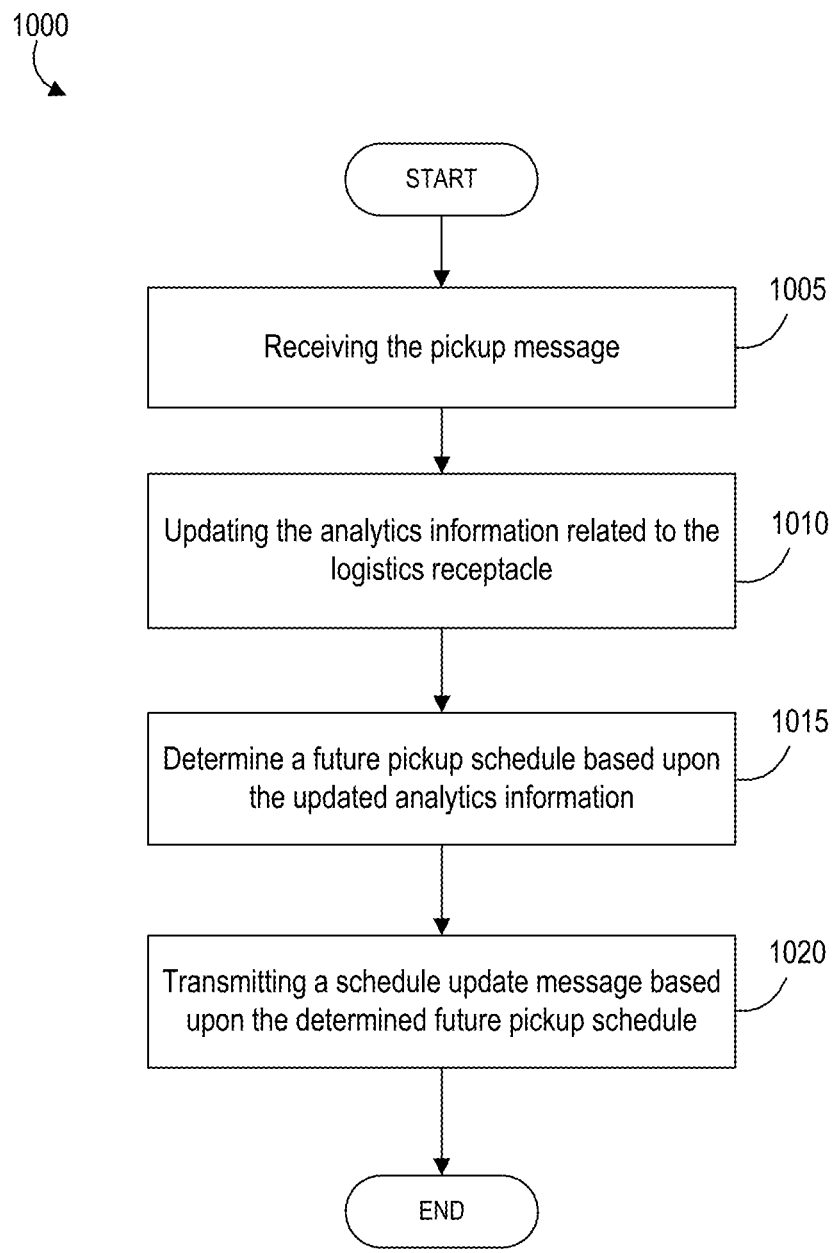
FIG. 10 is a flow diagram illustrating further system operations, performed by components within an exemplary server, for determining a future pickup schedule based upon updated analytics information related to the logistics receptacle and based upon the detected package type in accordance with an embodiment of the invention.

As an overview, FIG. 1 provides a basic operational system environment for an embodiment while FIG. 8 provides additional exemplary details related to such a system environment embodiment that each employ an enhanced logistics receptacle. FIGS. 2, 3A-C, 4, and 5A-C focus on mechanical, electrical, and software-implemented details of the exemplary logistics receptacle shown in FIGS. 1 and 8. FIGS. 6 and 7 focus on aspects shown on a package and images of such aspects in different embodiments. And FIGS. 9 and 10 provide flowchart diagrams that illustrate operational steps that may be implemented in various apparatus and systems described herein.

In more detail, FIG. 1 is a system diagram of an exemplary logistics receptacle in a communication configuration with an exemplary server in accordance with an embodiment of the invention. Those skilled in the art will understand and appreciate that a logistics receptacle is a general term for an apparatus used as a repository or container that temporarily maintains custody of one or more packages being shipped or moved from one location to another location.

Referring now to FIG. 1, an exemplary logistics receptacle 150 is shown that may accept a package 170 (as part of shipping the package 170) and communicate with a server 100 via a network 105. In one embodiment, server 100 may be implemented as a dispatch and/or operational planning backend server computer, through communication network 105. Additional details regarding exemplary server 100 in a system embodiment are described below with respect to FIG. 8.

While server 100 is shown in FIG. 1 connecting through network 105 to logistics receptacle 150, those skilled in the art will appreciate that server 100 may have a more direct or dedicated connections to the logistics receptacle 150 depending upon implementation details and desired communication paths. Furthermore, those skilled in the art will appreciate that an exemplary server may contain a collection of information within an internal database or other memory storage (not shown in FIG. 1), while multiple databases maintained on one or more other server platforms or network storage servers may be used in other embodiments to maintain such a collection of information accessible to server 100 via network 105. Additionally, while not shown in FIG. 1, those skilled in the art will appreciate that a database for information accessible to server 100 may be implemented with cloud technology that essentially provides networked storage of collections of information that may be directly accessible to networked computing devices, such as server 100.

Network 105 may be a general data communication network involving a variety of communication networks or paths. Those skilled in the art will appreciate that such exemplary networks or paths may be implemented with hard wired structures (e.g., LAN, WAN, telecommunication lines, telecommunication support structures and telecommunication processing equipment, etc.), wireless structures (e.g., antennas, receivers, modems, routers, repeaters, etc.) and/or a combination of both depending upon the desired implementation of a network 105 that interconnects server 100 and other components shown in an embodiment illustrated in FIG. 1 (e.g., logistics receptacle 150) as well as in FIG. 8 (e.g., third party database server 845).

Referring back to FIG. 1, the exemplary logistics receptacle 150 may temporarily maintain custody of packages being shipped. In an embodiment, exemplary receptacle 150 has an entrance through which a package being shipped can pass as the package is deposited within a storage or holding area of the receptacle 150. In some embodiments, the receptacle 150 may be implemented as a secure access receptacle or container (such as a locker type of logistics receptacle) having an entrance opening that is accessible to a shipping customer for depositing the item to be shipped, but once within the receptacle 150 the package is secure and only removed from a secure storage area within the receptacle by someone with a key or combination. Such an example of a logistics receptacle may be useful when deployed in situations where personnel are not actively managing the receptacle.

Figure 2:
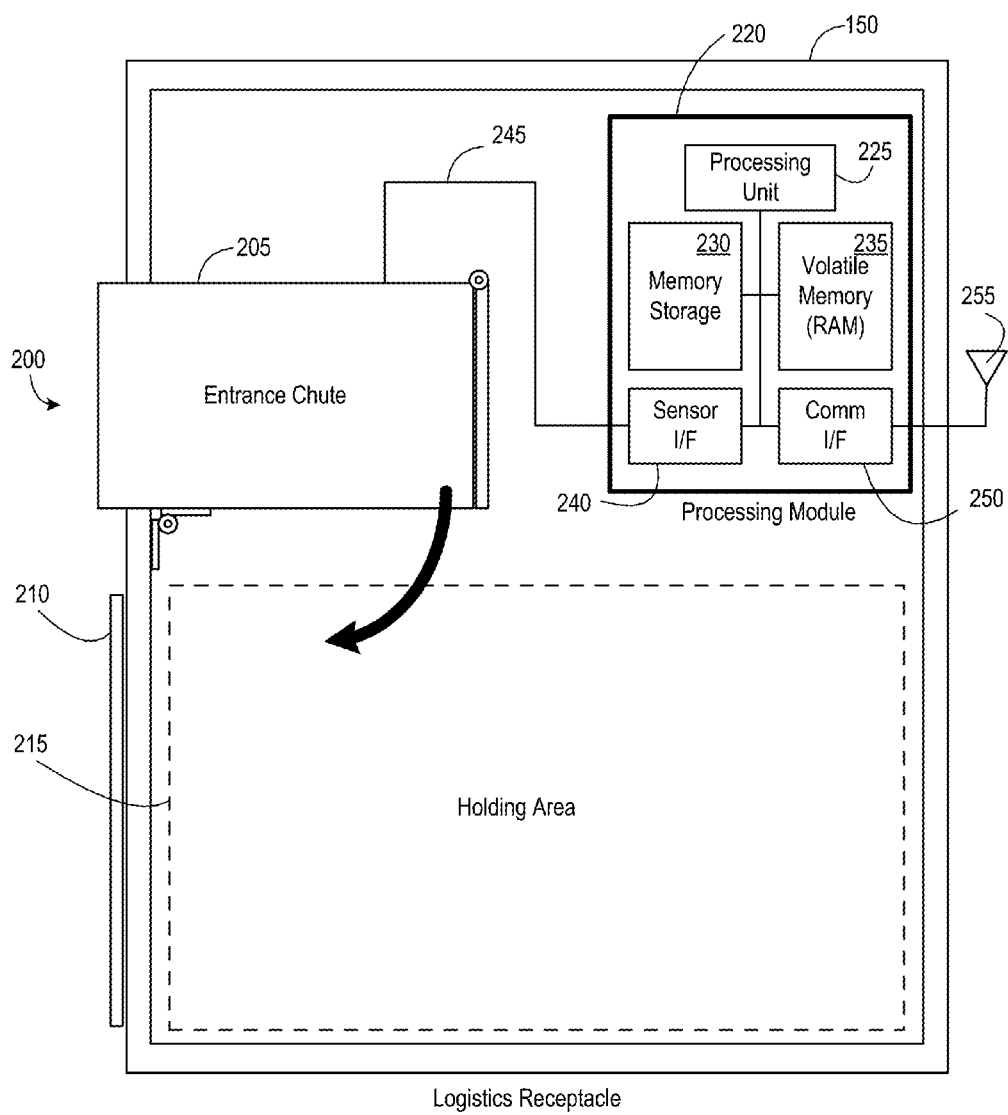
FIG. 2 is a detailed diagram of an exemplary logistics receptacle in accordance with an embodiment of the invention.

FIG. 2 is a more detailed diagram of various components making up the exemplary logistics receptacle 150 in accordance with an embodiment of the invention. Referring now to FIG. 2, the illustrated embodiment of logistics receptacle 150 includes an entrance 200 through which packages may be deposited, a holding area 215 defined within the receptacle 150 for temporarily maintaining custody of deposited packages, and a secure access door 210 on a front of the receptacle 150. The secure access door 210 provides a pickup entity with a way to pick up and retrieve deposited packages within the holding area 215.

As shown in FIG. 2, the illustrated embodiment of entrance 200 further includes an entrance chute 205 that can receive a package as it is being deposited within the holding area 215 of the receptacle 150. The exemplary chute 205 is configured to pivot relative to the front wall of the receptacle 150, and thereby allow the package received within the chute 205 to pass through an opening back end of the chute 205 leading to the holding area 215. As the back end is opening and the package moves as it is being deposited into the holding are 215, one or more images of the package's exterior surfaces may be captured and processed. While not shown in FIG. 2, other embodiments may have an outer door for chute 205 that may be lifted or otherwise moved to provide closable access to the receiving area within the chute 205. Other embodiments may also include actuating structure that mechanically moves chute 205 once the package is received within the chute 205 and, in some instances, after receiving input (e.g., a pressed button) from the shipping customer depositing the package in the receptacle 150. In addition to such mechanical structure, the exemplary logistics receptacle 150 shown in FIG. 2 further includes an exemplary processing module 220 that essentially operates as the intelligence within receptacle 150 along with various sensors. Processing module 220 may be powered via an external power source (not shown, and depending on the availability of such a source proximate the location of the receptacle 150), or may be operated by battery (not shown). In the battery operated embodiments, such a battery may be implemented as a rechargeable power source or a non-rechargeable power source intended to be disposed of after use. In some embodiments, the power source for processing module 220 may involve alternative energy generation, such as a solar cell.

In general, an embodiment of processing module 220 may be implemented as a specially adapted computing device, which is operative to respond to particular stimulus (e.g., a signal from a detection/movement sensor), control external sensors (e.g., one or more image sensors), analyze captured image data, and may in some instances transmit messages. More specifically, an embodiment of the module 220 may be configured and adapted by programming and onboard interfacing hardware to detect when a package has been provided to the receptacle via one or more sensors in the entrance chute 205, activate one or more image sensors disposed in the chute 205, receive image data captured by the image sensors, analyze such image data to determine a pattern match while tolerating less than ideal clarity of the captured image, identify the package type for the package and, in some embodiments, transmit a message to a server.

The exemplary processing module 220, as shown in FIG. 2, generally comprises a processing unit 225, a memory storage 230, a volatile memory (such as RAM) 235, and interfacing circuitry that includes sensor interface circuitry 240 and a communication interface 250 attached to an antenna 255. In general, the processing unit 225 is a processor-based device that is coupled to each of memory storage 230, volatile memory 235, sensor interface circuitry 240, and communication interface 250. In one embodiment, the processing unit 225 may be a single processor (such as a microcontroller, microprocessor, or multi-core processor). In another embodiment, processing unit 225 may be implemented with a combination of different processors, such as a microprocessor and a dedicated graphics processing engine that handles image processing duties. And in yet another embodiment, processing unit 225 may be implemented with multiple but similar processors.

Further, those skilled in the art will appreciate that processing unit 225 in processing module 220 is logic that generally performs computations on data (e.g., local data, data received, data newly generated) and executes operational and application program code and other program modules or sections thereof (e.g., operating systems, control programs) maintained within memory storage 230 and loaded into volatile memory 235 for execution. Thus, as processing unit 225 boots up and loads an operating system from memory storage 230 into volatile memory 235, the processing unit 225 may operate programming elements, such as a logistics receptacle control program 355 as shown in FIG. 3B, to interact with entrance chute 205, determine a package type being deposited, and potentially report the type of packages in the receptacle 105.

The communication interface 250 and antenna 255 provide the processing unit 225 with access to a communication path outside the logistics receptacle 150 (such as access to network 105 and server 100). For example, in one embodiment, communication interface 250 and antenna 255 may be implemented with a medium range radio in the form of an IEEE 802.11g compliant WiFi transceiver. In another embodiment, communication interface 250 and antenna 255 may be implemented with a longer range radio in the form of a cellular radio. Those skilled in the art will appreciate communication interface 250 and antenna 255 may be implemented for other formats and other communication path ranges (e.g., short range Bluetooth® communications) depending on the implementation and location of the other device desired for communications.

The sensor interface circuitry 240 provides a collective link 245 to multiple sensors disposed within the logistics receptacle 150. For example, detection signals sent to sensor interface 240 from a sensor within the entrance chute may indicate that a package have been provided, received, and/or is moving as part of being deposited within the receptacle 150. Link 245 may also provide activation signals from the sensor interface to various image sensors within the entrance chute 205, as well as provide captured image data from those image sensors back to processing module 220 through sensor interface 240.

Figure 3A:
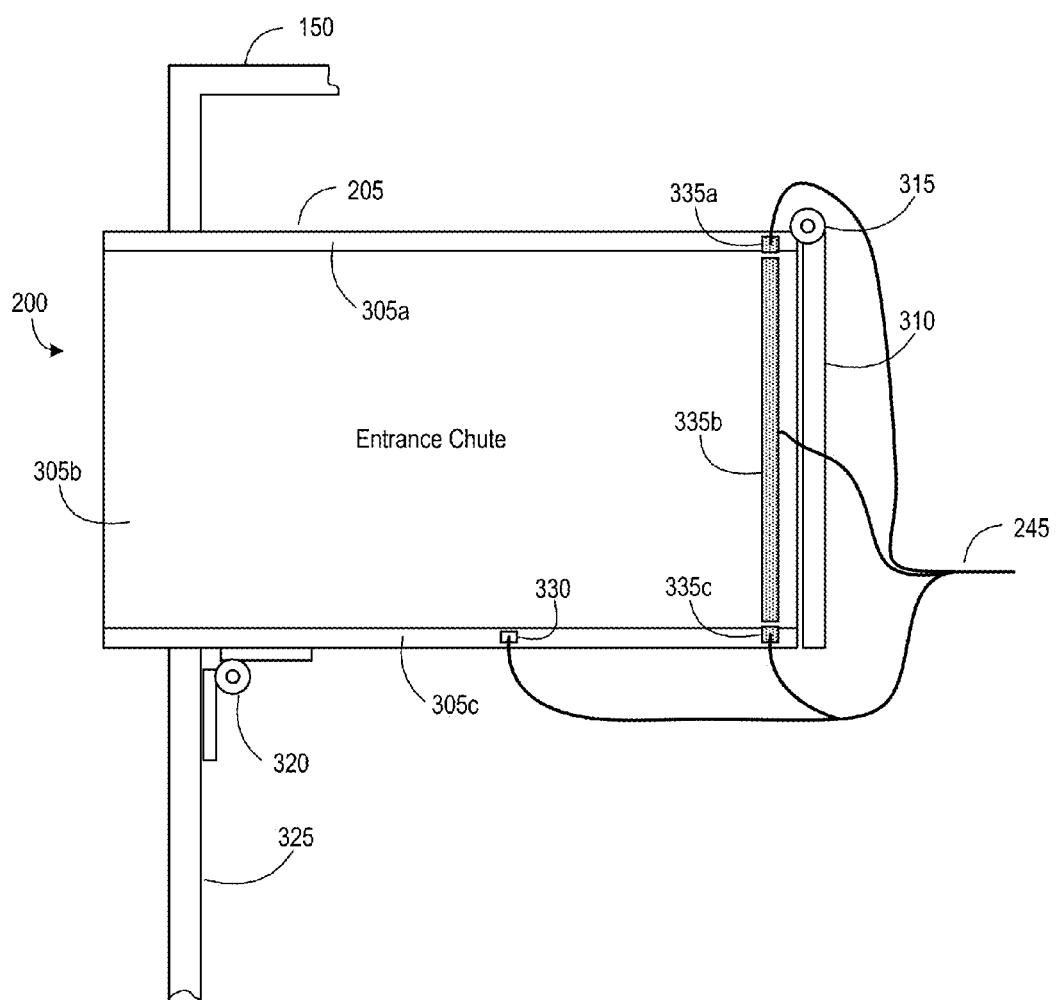
FIG. 3A is a detailed diagram illustrating an exemplary entrance chute of the exemplary logistics receptacle shown in FIG. 2 in accordance with an embodiment of the invention.
Figure 3B:
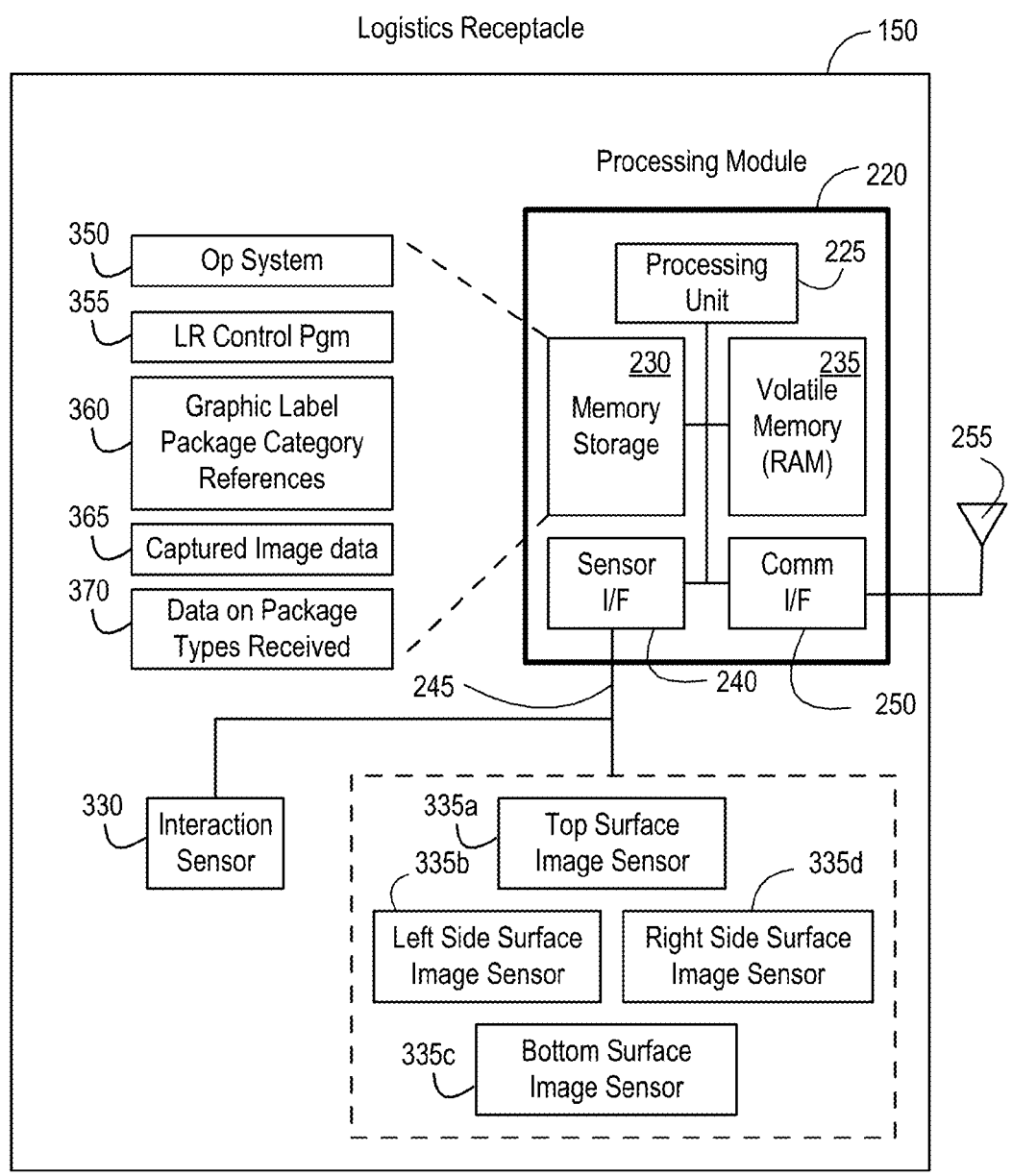
FIG. 3B is a detailed block diagram illustrating exemplary electronic hardware and software components of the exemplary logistics receptacle shown in FIG. 2 in accordance with an embodiment of the invention.

FIG. 3A is a detailed diagram illustrating an exemplary entrance chute in a cut-way perspective and disposed in a portion of the exemplary logistics receptacle 150. Referring now to FIG. 3A, further details regarding an embodiment of such a link 245 and sensors are shown as well as parts of an exemplary entrance chute 205. In particular, exemplary entrance chute 205 may comprise multiple walls 305a-305d that define a box-like receiving area within chute 205, as well as an opening back end wall 310 (also referred to as a pivoting or actuated rear door). Those skilled in the art will appreciate that while only chute walls 305a, 305b, and 305c are shown in FIG. 3A, a fourth wall (wall 305d) exists as shown in FIG. 4 but is left out of FIG. 3A for ease of explanation. As such, FIG. 3A shows a top wall 305a that abuts a side wall 305b, which then abuts a bottom wall 305c (noting that another side wall 305d as shown in FIG. 4 similarly abuts the top wall 305a and bottom wall 305b).

Figure 5C:
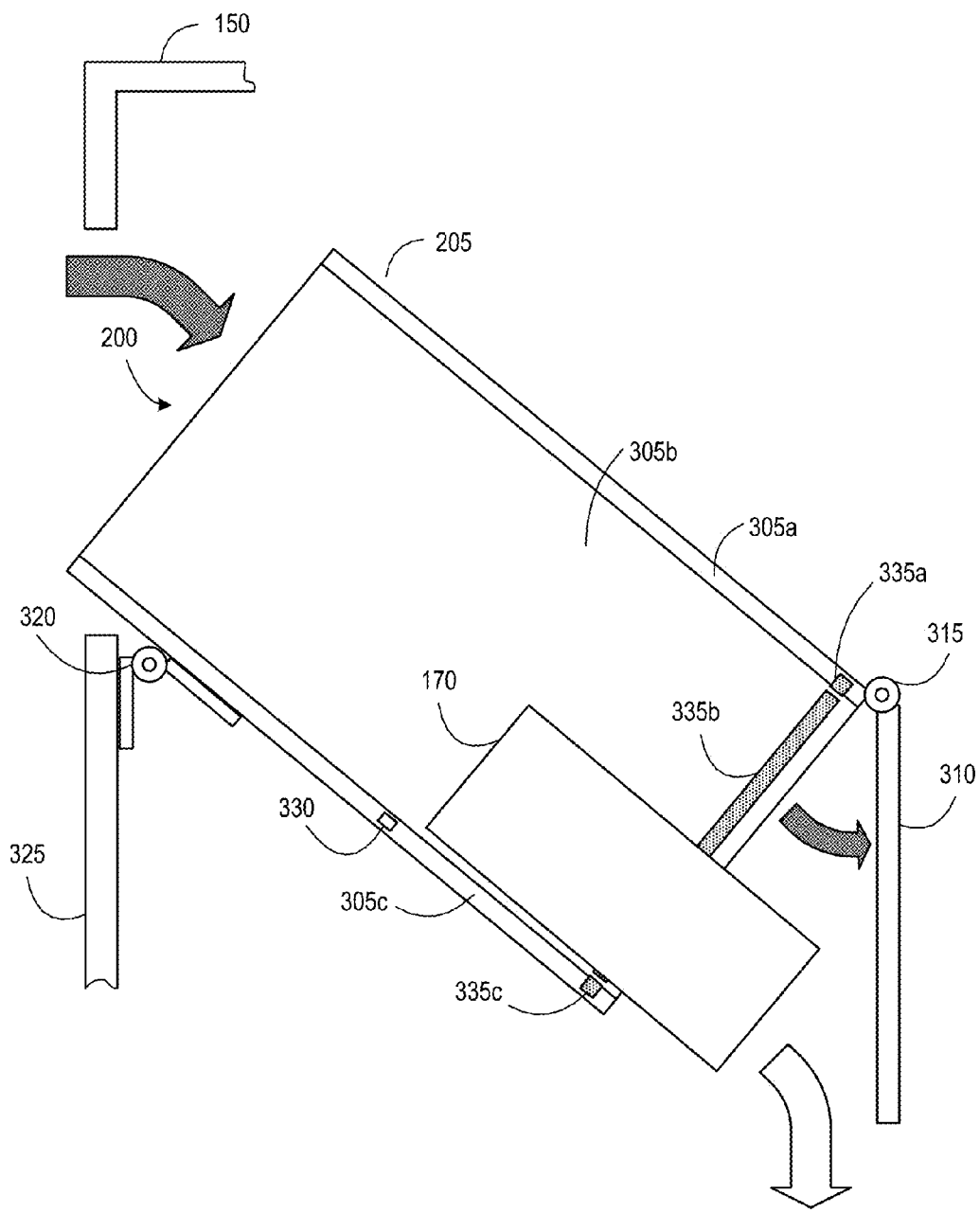

In one embodiment, the opening back end wall 310 is hinged or otherwise pivotally attached to the top wall 305a such that as the chute 205 is rotated in a clockwise manner about hinge 320 attached to a front wall 325 of receptacle 150, which drops the end having the back end wall 310 down, the hinged or pivoting back end wall 310 opens (as shown in more detail in FIG. 5C). In another embodiment, the opening back end wall may be specifically actuated via a signal from the processing module 220 to a controllable hinge 315, which may time when to open the back end wall 310.

In one embodiment, and as shown and explained in more detail below with respect to FIGS. 5B and 5C, the pivoting rear door 310 of chute 205 may open when the actuated chute 205 is repositioned to a desired angle in order to allow the package to slide through the chute 205 at a desired linear speed as the package passes near one or more image sensors disposed within the chute 205. While movement of the package at the substantially desired linear speed may not require controlled actuation of hinge 310 in an embodiment, those skilled in the art will appreciate that the ability to control when the rear door 310 of chute 205 opens in another embodiment may help to approximate or control the desired linear speed between the package and the image sensor accounting for gravity and frictional forces that may be applicable (e.g., known or measured weight of the package, which may be used to alter the desired angle when the rear door opens). Further embodiments may include a roller/bearing sheet type of reduced friction surface on a bottom surface of the chute 205 to help account for and minimize frictional forces that may impact or alter the desired angle to use when allowing the package to more consistently slide through chute 205 and into holding area 215.

In the illustrated embodiment shown in FIG. 3A, the exemplary entrance chute 205 includes an interaction sensor 330 and a plurality of image sensors 335a-335c. Generally, the interaction sensor 330 is operative to generate a detection signal that indicates when a package is provided to the logistics receptacle 150 within chute 205. In one embodiment, the interaction sensor 330 may be disposed within the chute 205. As such and depending upon the desired implementation, the interaction sensor may be implemented with, for example, a motion detector that senses the presence or movement of a package within the chute 205, a light sensor that detects blocked light due to a package positioned within the chute 205, a pressure sensor that detects the presence of a package received within the chute, or an accelerometer that senses movement of the chute. In other embodiments, the interaction sensor 330 may be implemented by a button or other type of user input device operated by a shipping customer and depressed/toggled/switched when a package has been provided within the entrance chute 205 of receptacle 150.

Thus, depending upon the type of interaction sensor 330 deployed, the interaction sensor 330 may detect when the package 170 has been provided to the receptacle 150, when the package 170 has been received within the entrance chute 205, when the entrance chute 205 is repositioned to deposit the package 170 within the holding area 215, or to detect a depositing motion of the package 170 as it moves within the receptacle 150 from the chute 205 into the holding area 215. In one embodiment, such a depositing motion may corresponds to an insertion motion of the package through the entrance chute 205 or a tilting motion of the package relative to the logistics receptacle 105.

Once the interaction sensor 330 detects the package is ready for imaging by generating the detection signal, the image sensor(s) 335a-335d may be selectively activated and then used to capture at least one image of at least a part or portion of an exterior surface of the package. Thus, the resulting captured image may cover all or a substantial part of the exterior surface but other embodiments may have the captured image corresponding to only a part or portion of the exterior surface. And as further described below, further embodiments may combine different captured images to represent a larger area of the exterior surface of the package, and the combined images may then be processed to analyze and distinguish whether a recognized pattern matches one of a set of categories respectively associated with different package types when determining a pattern match. A more detailed embodiment may capture different exterior images of at least a part of one side of the package; generate a composite image with these different exterior images via, for example, conventional image stitching techniques given an overlap between respective exemplary focus zones, to represent different sections of the part of the one side of the package; and then analyze the composite image to distinguish whether a recognized pattern matches one of a set of categories respectively associated with different package types when determining the pattern match.

As shown in FIG. 3A, image sensors 335a-335c are shown in the cut-away view but FIG. 4 further shows image sensor 335d on side wall 305d not appearing in FIG. 3A. In one embodiment, an image sensor, such as one of image sensors 335a-335d, may use a simple area camera that captures an image. Other embodiments may implement the image sensor with a camera that may capture multiple images that may then be stitched or otherwise combined together to represent a larger area of the package's external surfaces. Still further embodiments may implement the image sensor with a scanning type of image sensor (e.g., a contact image sensor (CIS)) in substantially close contact with at least one side of the package when the package is placed within the entrance chute 205 of the logistics receptacle 105. With such an exemplary CIS type of image sensor, the package moves relative to line scanning imaging elements within the CIS, and thus captures line scans at a desired linear speed (controlled, dictated, or imparted by movement of the package, which may be initiated by pivoting or actuation of the chute 205 and/or the rear door 310 accounting for gravity and, in some examples, frictional forces on the package as it moves relative to the bottom wall 305c of the chute 205). Thus, in another embodiment, those skilled in the art will appreciate that activated ones of image sensors 335a-335d are operative to capture different exterior images of at least one or more parts of the package exterior as the package moves through the entrance chute 205 relative to image sensors 335a-335d disposed about the entrance chute 205 when the package is being deposited into the holding area 215.

In a further embodiment, an image sensor may not be substantially close to a surface of the package. For example, a top surface image sensor 335a may be disposed within the entrance chute 205 where it is not in substantially close contact with the package. When the top surface image sensor 335a is activated, this sensor may operate to capture an image of all or a part of a top exterior surface of the package as the package moves through the entrance chute when being deposited into the holding area of the logistics receptacle and may do so using a plurality of focus zones to capture differently focused images of the top exterior surface of the package as the image of the top exterior surface of the package as the package moves through the entrance chute. Generally, the processing unit may then determine the most focused of the differently focused images and use that most focused image as the captured image for further processing and pattern matching as described herein.

Figure 3C:
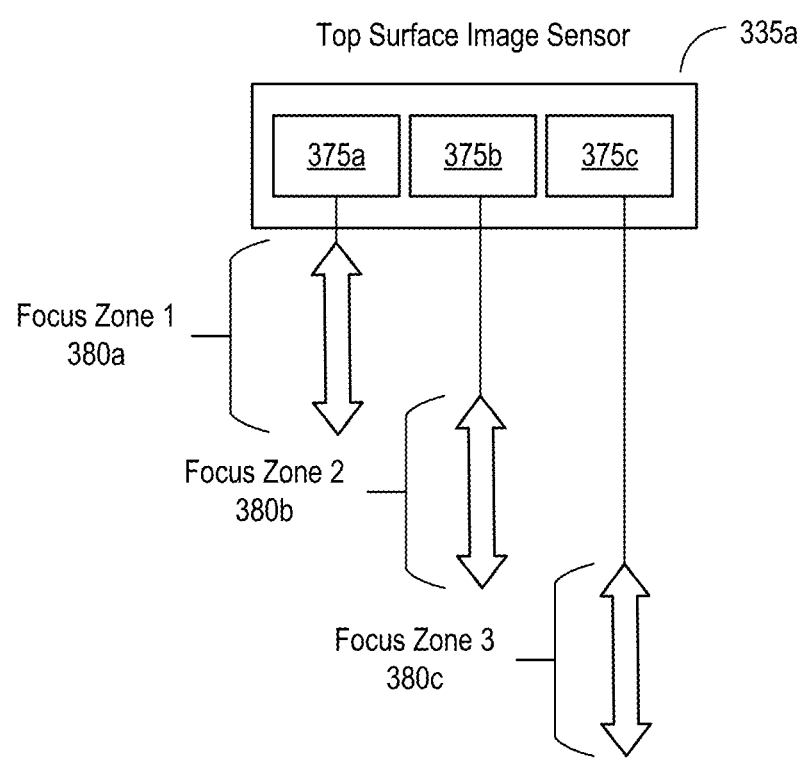
FIG. 3C is a detailed diagram illustrating an exemplary image sensor operative to have staggered focus zones in accordance with an embodiment of the invention.

For example, FIG. 3C illustrates an exemplary image sensor operative to have staggered focus zones that may be used in an embodiment. Referring now to FIG. 3C, an example of top surface image sensor 335a is shown in more detail in this embodiment to have multiple imaging elements (e.g., lenses and image sensors) 375a-375c that collectively operate to capture images with different respective focus zones 380a-380c. The example focus zones 380a-380c may be next to each other in one embodiment, or may be slightly overlapping in other embodiments. Thus, by deploying an image sensor, such as top surface image sensor 335a, having multiple focus zones, the image sensor is able to adapt to capture appropriate images of different sized packages. Further embodiments may implement the imaging elements 375a-375c with a single shared imaging sensor that uses different focal length lens elements instead of separate and individual lens/sensor combinations that collectively make up the top surface image sensor 335a.

In other embodiments (not shown in FIG. 3A), image sensors 335a-335d may be physically actuated by one or more spring mechanisms integrated into walls of the chute 205 such that the image sensors 335a-335d may come in closer proximity to relative surfaces of the package as the package lays within the chute 205 and as the package moves through the chute 205 and past the image sensors 335a-335d when being deposited within receptacle 150. Such actuated image sensors may provide the advantage of a more conformal imaging of the package as it moves relative to the chute 205, but at a mechanical complexity where utilizing different focus zones instead in an embodiment may be more cost efficient.

As discussed in more detail below, activation of one or more of the image sensors may be selective. For example, there are embodiments where not all image sensors need be activated upon detection of a package by the interaction sensor. And there are further embodiments where after a threshold number of different types of packages has been identified, the processing module 220 may not activate any of the image sensors 335a-335d in order to conserve energy.

In another embodiment, the image sensors deployed within chute 205 may be continuously activated in a manner that scans, captures, and identifies a barcode that appears on one or more sides of the package. Further embodiments may incorporate different sensors for barcode scanning and capture and image sensing, as explained herein to determine a pattern match, to provide further flexibility in recognizing the type of package from an image pattern mage (using machine vision type of methods) and from a lookup match to the scanned barcode where different barcodes represent different types of packages.

While FIG. 3A provides more details on the mechanical structure of the entrance chute 205 and sensors used with the chute 205 of logistics receptacle 150, FIG. 3B provides further information on exemplary electronic hardware and software components of the exemplary logistics receptacle 150 than described with respect to FIG. 2. Referring now to FIG. 3B, processing module 220 is illustrated in this embodiment connected by link 245 to interaction sensor 330 and the exemplary image sensors 335a-335d (i.e., top surface image sensor 335a, top surface image sensor 335a, left side surface image sensor 335b, bottom surface image sensor 335c, and right side surface image sensor 335d). Additionally, in the embodiment shown in FIG. 3A, memory storage 230 maintains a variety of program code (e.g., operating system 350 and logistics receptacle (LR) control program 355) and other data elements (e.g., graphic label package category reference information 360 associated with different package types, captured image data 365, generated data on package types received 370). Those skilled in the art will appreciate that memory storage 230 is a tangible, non-transient computer readable medium on which information (e.g., executable code/modules, reference data, operational data, image data, etc.) may be kept in a non-volatile and non-transitory manner. Examples of such memory storage 230 may include a hard disk drive, ROM, flash memory, or other media structure that allows long term, non-volatile storage of information. In contrast, volatile memory 235 is typically a random access memory (RAM) structure used by processing unit 225 during operation of the processing module 220. Upon power up of processing module 220, volatile memory 235 may be populated with an operating system (e.g., operating system 350), an operational program (such as LR control program 355) or specific program modules that help facilitate particular operations of processing module 220. And during operation of processing module 220, volatile memory 235 may also include certain data (e.g., graphic label package category reference information 360 associated with different package types, captured image data 365, generated data on package types received 370, and the like) generated as the processing module 220 (notably the processing unit 225 within module 220) executes instructions as programmed or loaded from memory storage 230. However, those skilled in the art will appreciate that not all data elements illustrated in FIG. 3A must appear in memory storage 230 and volatile memory 235 at the same time.

In one embodiment, the processing module 220 may be implemented using a BeagleBone Black computing device, which includes a Sitara AM3358BZCZ100 processor and an SGX530 graphics accelerator (collectively operating as a type of processing unit). The processor is coupled to 2 Gbytes of 8-bit non-volatile memory storage and 512 Mbytes of volatile memory (DDR3 RAM). The processor may run a variety of different operating systems (such as Linux, Android, or Ubuntu), at least one of which being maintained within the onboard memory storage coupled to the processor. And the processor is coupled to various interfacing circuitry (e.g., USB ports, serial ports connected to multi-pin UART circuitry, expansion connectors, timer circuits, GPIO ports) and various types of communication interfaces (e.g., an Ethernet interface for network connectivity). Another embodiment may use the BeagleBone Black device deployed with an ARM Cortext-A8 processor.

In additional embodiments, one skilled in the art will appreciate that similar functionality in a processing module may be implemented in other types of hardware. For example, processing module 220 may be implemented with specially optimized hardware (e.g., one or more particular application specific integrated circuits (ASIC) having the same operational control and functionality as LR control program code, as described herein), discrete logic, or a combination of hardware and firmware depending upon requirements of the processing module, such as power, processing speed, complexity of images to be processed, cost, space, etc.

FIG. 4 is a diagram illustrating a perspective frontal view of the interior walls of exemplary entrance chute 205. Referring now to FIG. 4, the perspective view of logistics receptacle 150 illustrates each of the walls 305a-305d and their respective image sensors 335a-335d as disposed within the exemplary chute 205. Here, the exemplary chute 205 is shown looking through the entrance opening to within the receiving area of chute 205. At the opposite end of chute 205, FIG. 4 illustrates the hinged or pivoting back end wall 310 that can open up when the chute 205 is repositioned.

Additionally, FIG. 4 illustrates an impression 400 within which an exemplary interaction sensor 330 may be disposed. The impression 400 provides a countersunk space or area for interaction sensor 330 so that it does not interfere with a package placed within the receiving area of chute 205. Additionally, in some embodiments, a protective transparent inlaid cover may be disposed within impression 400 to protect the interior space defined by impression 400 from dirt or other undesirable particles from collecting. Thus, FIGS. 2, 3A, 3B, and 4 provide details regarding the components making up an exemplary logistics receptacle 150.

FIGS. 5A-C are a series of diagrams illustrating such an exemplary logistics receptacle 150 in operation as a package is provided to, received by, and deposited within the receptacle 150 in accordance with an embodiment of the invention. Referring now to FIG. 5A, exemplary entrance chute 205 is open and receptive to having a package 170 placed within it. In this configuration, a shipping customer may provide the package 170 to the receptacle 150 through opening 200 of the chute 205.

Once provided to the receptacle 150, as shown in FIG. 5B, interaction sensor 330 may generate a detection signal to indicate this condition in the illustrated embodiment. In another embodiment, interaction sensor 330 may be implemented as a motion detecting sensor (e.g., an accelerometer) and generate the detection signal once the chute 205 is repositioned (e.g., tilted or pivoted) as part of depositing the package 170 within receptacle 150. In a further embodiment, the interaction sensor may be a motion detector that detects motion of the package 170 as it is being inserted into and/or through the chute 205 or as the package 170 tilts relative to the receptacle 150.

And in the configuration shown in FIG. 5B, one or more of the image sensors 335a-335d may be selectively activated by the processing module 220 after receiving the detection signal from the interaction sensor 330. An embodiment may activate all of the image sensors 335a-335d, only some of them, or may opt not to activate any of them based upon the existing status of the logistics receptacle 150. In more detail, an embodiment may selectively activate the image sensors based upon whether a threshold number of different types of packages have been previously identified. For example, if only a single type of package has been previously identified (associated with only a single pickup entity), then the receptacle 150 may activate the image sensors 335a-335d until the other type of package has been identified (associated with another pickup entity). In this example, identifying two different package types may be enough so that further imaging to determine package type and, as a result, different pickup entities may no longer be necessary until the receptacle has been serviced. As such, this selective aspect of activating image sensors enables a conservation aspect to power consumption by the receptacle and the potential for extending a battery life of the power source for the receptacle.

In the configuration and state shown in FIG. 5C, the chute 205 rotates about hinge 320 on the front wall 325 of the receptacle 150. As the chute 205 rotates in this illustrated embodiment, the opening back end door 310 opens and allows package 170 to move relative to the receptacle 150. In particular, package 170 moves through chute 205 at a desired point. For example, the pivoting rear door 310 may open when the actuated drop chute 205 is repositioned to a desired angle that allows the package 170 to slide through the actuated drop chute 205 at a desired linear speed as the package 170 passes near the image sensors 335a-335d. As such, chute 205 operates as a type of imaging tunnel using the activated image sensors 335a-335d as scanning image sensors (some of which are in substantially close contact with the package as it moves by the sensor; some of which may be in less close contact with the package as it moves by the sensor). The result is that images of portions (or the entire) exterior surfaces of the package 170 are captured by one or more image sensors 335a-335d as the package 170 moves through the chute 205, past the image sensors 335a-335d, past the back end door 310, and into the holding area 215 of receptacle 150. And as such, the resulting image captured by the activated image sensor(s) is received at the processing module 220 for computer vision type of processing by LR control program 355 relative to graphic label package category references 360 (e.g., known image references associated with particular types of packages used by certain pickup entities) to determine and identify a pattern match for the package 170 being deposited.

FIG. 6 is a perspective diagram illustrating an exemplary package and an exemplary label affixed to a surface of the package in accordance with an embodiment. Referring now to FIG. 6, package 170 is illustrated in perspective in an embodiment. In particular, FIG. 6 provides an example of how a package 170 may have an exterior surface 600 having exemplary shipping label 605 affixed to the surface. Those skilled in the art will appreciate that there are a variety of symbols and graphic images that may be included on such an exemplary shipping label. As shown in FIG. 6, exemplary shipping label 605 may include an address portion (which may identify the intended recipient and their address) along with various symbols (e.g., one or more linear barcodes, quick response (QR) codes, or other graphic symbols) and other information related to the shipment (e.g., the name of the logistics entity handling the shipping, the name of the level of shipping service purchased for shipping the package, a tracking code, etc.). For some shipping labels, a graphic symbol (such as a letter or number or combination thereof) may be used to represent the type of package service needed when shipping the package and its associated pickup entity. For example, FIG. 6 illustrates a symbol "E" 610 that is boxed in as part of the shipping label 605 on a side 600 of package 170.

The symbols, graphics, and other features that appear on the side of a package may be used when attempting to determine a pattern match in an embodiment, even when the captured image is less than ideal and in a rough resolution. For example, when an image of side 600 is captured in an embodiment, such an image may show a relatively clear representation of the shipping label 700 and the symbol 705 when the side 600 is in substantially close contact with the respective scanning image sensor capturing the image. However, when the side 600 is not in substantially close contact with the respective image sensor capturing the image, the captured image may be a fuzzy or out of focus image of the shipping label 710 and the symbol 715. Such an out of focus image of the label 710 and symbol 715 may be unusable for barcode reading (which typically requires a higher resolution and clarity to distinguish the necessary details), an embodiment may still be able to determine a pattern match using such an out of focus or lower resolution captured image of the side of the package.

When deployed in an exemplary system embodiment, such a logistics receptacle 150 may identify the package type of the package deposited based upon a pattern match and then transmit a message to server 100 as part of determining a future pickup schedule for the receptacle 150 based on updated analytics information for the receptacle 150. FIG. 8 is a detailed block diagram illustrating components of such an exemplary system. Referring now to FIG. 8, logistics receptacle 150 is shown having two packages 870a and 870b in its custody. The embodiment of receptacle 150 shown in FIG. 8, and as explained in more detail with respect to FIGS. 2, 3A, 3B, 4, and 5A-5C, may have an entrance chute through which a package may be deposited, an interaction sensor disposed on the logistics receptacle that generates a detection signal when the package is provided to the logistics receptacle within the entrance chute, and an image sensor disposed within the entrance chute. Upon activation, the image sensor is operative to capture a first package exterior image corresponding to at least one side of the package.

The embodiment of receptacle 150 shown in FIG. 8, and as explained in more detail with respect to FIGS. 2, 3A, 3B, 4, and 5A-5C, may also have a processing module (e.g., module 220) having a receptacle processing unit (e.g., processing unit 225) coupled to each of an interaction sensor (e.g., sensor 330) and an image sensor (e.g., one of image sensors 335a-335d). In a further embodiment, the image sensor may be implemented with a plurality of surface image sensors (e.g., image sensors 335a-335d), where each of the surface image sensors is disposed about the entrance chute in a configuration (e.g., a tunnel-like configuration) to capture a different exterior image of the package as the package moves through the entrance chute when being deposited into a holding area of the logistics receptacle.

The processing unit is also coupled to a first memory unit (e.g., memory storage 230) that maintains a set of graphic label category references (e.g., references 360) respectively associated with different package types. The processing unit is also coupled to a receptacle communication interface (e.g., communication interface 250 and antenna 255) providing access to network 105.

For the system embodiment of FIG. 8, the receptacle processing unit is adapted and operative, via the coupled hardware and the software running in volatile memory (e.g., LR control program 355), to perform certain functions or tasks. For example, the processing unit in processing module 220 of receptacle 150 may be adapted and operative to receive the detection signal from the interaction sensor, activate at least one image sensor to cause the image sensor to capture the first package exterior image upon receipt of the detection signal, receive the captured first package exterior image from the image sensor, analyze the captured first package exterior image compared with respective ones of the set of graphic label category references to recognize a pattern match related to the package type of the package, identify the package type for the package based upon the recognized pattern match, and then cause the receptacle communication interface to transmit a pickup request message related to the identified package type over the network 105 to server 100.

In a further system embodiment where the image sensor may comprise multiple surface image sensors, the processing unit in processing module 220 of receptacle 150 may be adapted and operative to activate each of the surface image sensors to respectively capture a plurality of exterior images respectively corresponding to a plurality of surfaces of the package, and to analyze the captured plurality of exterior images to determine the pattern match.

Back to the system embodiment shown in FIG. 8, the pickup request message is broadcast from receptacle 150 through network 105 and is then received by server 100. An embodiment of server 100, operating as a dispatch server that handles operational planning for pickup schedules, may include a server processing unit 800 and subsystems coupled to the processing unit, such as server memory storage 805, server volatile memory 810, and server communication interface 815.

Server 100 is generally described with respect to FIG. 2. With respect to FIG. 8, the exemplary server 100 is shown in more detail as having the server processing unit 800, which is essentially logic that generally performs computations on data (e.g., local data, data received, data newly generated) and executes operational and application program code and other program modules or sections thereof (e.g., operating systems, control programs) maintained within memory storage 805 and loaded into volatile memory 810 for execution. More particularly, in the system embodiment illustrated in FIG. 8, server memory storage 805 maintains a variety of program code (e.g., operating system 820 and server control program 825) and other data elements (e.g., analytics information 830 associated with different logistics receptacles, existing schedule data 835, and future schedule data 840).

Those skilled in the art will appreciate that server memory storage 805 is a tangible, non-transient computer readable medium on which information (e.g., executable code/modules, analytics data, operational schedule data, message data, etc.) may be kept in a non-volatile and non-transitory manner. Examples of such memory storage 805 may include a hard disk drive, ROM, flash memory, or other media structure that allows long term, non-volatile storage of information. In contrast, server volatile memory 810 is typically a random access memory (RAM) structure used by processing unit 800 during operation of the server 100. Upon power up of server 100, volatile memory 810 may be populated with an operating system (e.g., operating system 820), an operational program (such as server control program 825) or specific program modules that help facilitate particular operations of server 100. And during operation of server 100, volatile memory 810 may also include certain data (e.g., analytics information 830 associated with different logistics receptacles, existing schedule data 835, and future schedule data 840, and the like) generated as the server 100 (notably the processing unit 800 within server 100) executes instructions as programmed or loaded from memory storage 805. However, those skilled in the art will appreciate that not all data elements illustrated in FIG. 8 must appear in memory storage 805 and volatile memory 810 at the same time.

In the illustrated embodiment of FIG. 8, while the analytics information 830 is associated with logistics receptacle 150, such information may be implemented as a set of analytics information related to and associated with a group of logistics receptacles in other embodiments. In a more detailed embodiment, the analytics information 830 may include at least historic event information related to the logistics receptacle 150. For example, such historic event information may comprise information on a prior detected package type for the logistics receptacle, time information related to a prior detected package type for the logistics receptacle, customer information related to a prior package picked up from the logistics receptacle, a pattern of customer interaction with the logistics receptacle, and/or logistics operational information for the logistics receptacle.

In another embodiment, the analytics information 830 may include environmental information related to the location of the logistics receptacle. For example, such environmental information may comprise at least one of demographics information related to the location of the logistics receptacle, crime information related to the location of the logistics receptacle, and weather information related to the location of the logistics receptacle. In some embodiments, the source of such analytics information 830 may be a database or other memory storage accessible by server 100 over network 105 (e.g., third party database 845).

The server communication interface 815 provides access to network 105. Through this interface 815, server 100 may communicate with receptacle 150 as well as other networked devices. Examples of a networked device that may communicate with server 100 includes, as shown in FIG. 8, another server 845 that may host third party information (e.g., customer demographic information related to an area surrounding receptacle 150, crime rates for the area surrounding receptacle 150, and weather information for the area where receptacle 150 is deployed). Such information may be useful for server 100 to access and use/update as part of analytics information 830). Another example networked device capable of communicating with server 100 may also include wireless components, such as a radio within a FedEx® Express pickup entity vehicle 820a or a radio within a FedEx® Ground pickup entity vehicle 820b.

As deployed in the system embodiment illustrated in FIG. 8, the server processing unit 800 may be adapted and operative, via the coupled hardware and the software running in volatile memory (e.g., server control program 825), to perform certain functions or tasks. For example, the processing unit 800 in server 100 of receptacle 150 may be adapted and operative to receive the pickup request from the server communication interface 815, update the analytics information 830 related to the logistics receptacle based upon the information in the pickup request, determine a future pickup schedule based upon the updated analytics information, and cause the server communication interface 815 to transmit a schedule update message based upon the determined future pickup schedule. Such a schedule update message may be broadcast through server communication interface 815 to different pickup entities, such as FedEx® Express pickup entity vehicle 820a or FedEx® Ground pickup entity vehicle 820b, so as to make sure appropriate pickup entities are aware of what is ready for pickup at an operationally desired time (e.g., when crime rates are noted as being low, when historical drop events predict future drop events on particular days and times, etc.).

Thus, a system embodiment may have the receptacle 150 providing package information to server 100, which then is able to update its analytics information 830 for receptacle 150 so that predictive analytics may be used to determine a future schedule for pickup in light of such updated analytics information 830 and messages to relevant pickup entities may be broadcast from server 100. The ability to determine a future schedule based on analytics information (i.e., to use predictive analytics) helps the system understand and appreciate patterns of customer behavior for a particular logistics receptacle and leverage such patterns when determining operational plans, such as future pickup schedules.

In a further system embodiment, the receptacle processing unit may be further adapted and operative upon receipt of the detection signal to selectively activate the image sensor based upon whether a threshold number of different types of packages have been previously identified. For example, once two different types of packages have been previously identified (e.g., at least one type of package for FedEx® Express pickup and at least one type of package for FedEx® Ground pickup), the image sensor need not be activated. Thus, such selective activation provides a level of energy conservation within the receptacle of the system.

Those skilled in the art will appreciate that the above identification of particular program code or modules and data are not exhaustive and that embodiments may include further executable program code or modules as well as other data relevant to operations of a processing-based device, such as logistics receptacle and a server.

The operation of such an exemplary apparatus as the logistics receptacle described above and the exemplary system using the logistics receptacle and the server described above may further be explained with general flow diagrams of FIGS. 9 and 10. Those skilled in the art will appreciate that the exemplary steps identified in such diagrams generally define applications of algorithms that adapt and configure the processing devices in processing module 220 and server 100 to operate in a specific manner when executing instructions of the LR control program 355 and server control program 825, respectively.

FIG. 9 is a flow diagram illustrating an exemplary method, performed by components within a logistics receptacle, for detecting a package type of a package deposited within the logistics receptacle in accordance with an embodiment of the invention. Referring now to FIG. 9, exemplary method 900 begins at step 905 by detecting when the package is provided to the logistics receptacle.

In one embodiment this may be done by the interaction sensor 330 and its generated detection signal sent to the receptacle's processing unit 225. In other embodiments, the step of detecting may comprise detecting, with the interaction sensor, when the package has been received within the entrance chute, when the entrance chute is repositioned to deposit the package within a holding area of the logistics receptacle, or when detecting a depositing motion of the package by the interaction sensor. Such a depositing motion may correspond to at least one of an insertion motion of the package through the entrance chute or a tilting motion of the package relative to the logistics receptacle.

At step 910, method 900 continues by activating the image sensor, after detection by the interaction sensor, to capture a first package exterior image corresponding to at least a part of one side of the package. The resulting captured image may, in some examples, be a single area image, a combination of images that may be effectively combined, or a series of line scans that collectively make up a resulting image. In one embodiment, the image sensor may be implemented with a scanning image sensor (such as a contact image sensor) in substantially close contact with the package when the package is placed within the entrance chute of the logistics receptacle. In a further embodiment, the image sensor may be implemented with a plurality of surface image sensors, where each of the surface image sensors is disposed about the entrance chute of the logistics receptacle to capture a different exterior image of the package as the package moves through the entrance chute when being deposited into a holding area of the logistics receptacle.

In another embodiment, the activating in step 910 may further comprise activating each of the surface image sensors to respectively capture a plurality of exterior images respectively corresponding to parts of all of a plurality of surfaces of the package, such that processing the captured image may involve processing each of the captures exterior images to determine the pattern match In one embodiment, one of the surface image sensors may comprise a top surface image sensor disposed within the entrance chute. This top surface image sensor may not be in substantially close contact with the package, and when activated, the top surface image sensor can capture an image of a top exterior surface of the package as the package moves through the entrance chute when being deposited into the holding area of the logistics receptacle. In an even more detailed embodiment of method 900, step 910 may have the top surface image sensor, when activated, capturing the image of the top exterior surface of the package using a plurality of focus zones to capture differently focused images of the top exterior surface of the package as the image of the top exterior surface of the package as the package moves through the entrance chute when being deposited into the holding area of the logistics receptacle.

And in still a further embodiment of method 900, step 910 may be implemented as selectively activating the image sensor, upon detection by the interaction sensor, based upon whether a threshold number of different types of packages have been previously identified.

At step 915, the captured first package exterior image is processed. This is done to determine a pattern match related to the package type of the package via steps 920-935. In particular, step 920 compares the processed images with a graphic label category reference. In one embodiment, this may comprise analyzing the captured first package exterior image to distinguish whether a recognized pattern matches one of a set of label categories respectively associated with different package types when determining the pattern match. For example, this may involve using computer vision techniques to electronically perceive and identify different parts of the captured image and compare them to reference symbols or images associated with particular package types (e.g., one of the graphic label package category references 360).

If the captured image matches the pattern of the one reference at step 925, then method 900 proceeds to step 930. Otherwise, step 925 proceeds to step 935 where another reference is used to then compare against the processed captured image in step 920. At step 930, the package type for the package is identified based upon the determined pattern match.

And at step 940, which follows step 930, the method 900 may include the step of transmitting a pickup request message to a server. More specifically, step 940 may be implemented by transmitting a pickup request message to a dispatch system, where the pickup request message is related to the identified package type. As such, the dispatch system (e.g., server 100) may use the identified package type to update analytic information related to the receptacle and better determine a future dispatch schedule related to the receptacle. In yet another embodiment, step 940 may involve transmitting a pickup request message to a dispatch system only when a threshold number of different types of packages have been identified (such as when a package from different pickup entities has been detected as being deposited and different pickup entities need to service the receptacle).

Those skilled in the art will appreciate that method 900 as disclosed and explained above in various embodiments may be implemented on a logistics receptacle (such as receptacle 150 as illustrated in FIGS. 2, 3A, 3B, 4, and 5A-5C), running one or more parts of a logistics receptacle control and management code (such as LR control program 355) to implement any of the above described functionality. Such code may be stored on a non-transitory computer-readable medium (such as memory storage 230). Thus, when executing such code, a processing unit of the logistics receptacle (such as processing unit 225) may be operative to perform operations or steps from the exemplary methods disclosed above, including method 900 and variations of that method. Such exemplary steps performed when executing such code may include receiving a detection indication from the interaction sensor when the package is provided to the logistics receptacle; activating the image sensor after receiving the detection signal from the interaction sensor; receiving a first package exterior image captured by the activated image sensor, the first package exterior image corresponding to at least one side of the package; processing the captured first package exterior image to determine a pattern match related to the package type of the package; and identifying the package type for the package based upon the determined pattern match.

FIG. 10 is a flow diagram illustrating further system operations, performed by components within an exemplary server, for determining a future pickup schedule based upon updated analytics information related to the logistics receptacle and based upon the detected package type in accordance with an embodiment of the invention. Referring now to FIG. 10, exemplary method 1000 begins at step 1005 by receiving the pickup request from the server communication interface. For example, the pickup request may be a message, such as the pickup request message noted above in step 940 of FIG. 9. Method 1000 continues at step 1010 by updating the analytics information related to the logistics receptacle. Such updating is based at least upon what is in the pickup request (e.g., what type of package was deposited, when it was deposited, etc.), but may also involve updating analytics information from other third party sources (such as from third party databases) or from other logistics company operational information (such as historic information, information on a pattern of customer behavior for a particular logistics receptacle, etc.). At step 1015, method 1000 continues by determining a future pickup schedule based upon the updated analytics information; and then causing the server communication interface to transmit a schedule update message based upon the determined future pickup schedule in step 1020.

Those skilled in the art will appreciate that method 900 as disclosed and explained above in various embodiments may be implemented on a logistics receptacle (such as receptacle 150 as illustrated in FIGS. 2, 3A, 3B, 4, and 5A-5C), running one or more parts of a logistics receptacle control and management code (such as LR control program 355) to implement any of the above described functionality. Such code may be stored on a non-transitory computer-readable medium (such as memory storage 230). Thus, when executing such code, a processing unit of the logistics receptacle (such as processing unit 225) may be operative to perform operations or steps from the exemplary methods disclosed above, including method 900 and variations of that method.

It should be emphasized that the sequence of operations to perform any of the methods and variations of the methods described in the embodiments herein are merely exemplary, and that a variety of sequences of operations may be followed while still being true and in accordance with the principles of the present invention.

At least some portions of exemplary embodiments outlined above may be used in association with portions of other exemplary embodiments to better manage and locate nodes in a wireless node network or use such nodes and network elements as part of a hierarchical node network. Moreover, at least some of the exemplary embodiments disclosed herein may be used independently from one another and/or in combination with one another and may have applications to devices and methods not disclosed herein.

Those skilled in the art will appreciate that embodiments may provide one or more advantages, and not all embodiments necessarily provide all or more than one particular advantage as set forth here. Additionally, it will be apparent to those skilled in the art that various modifications and variations can be made to the structures and methodologies described herein. Thus, it should be understood that the invention is not limited to the subject matter discussed in the description. Rather, the present invention is intended to cover modifications and variations.

What is claimed is:

1. A method for detecting a package type of a package deposited within a logistics receptacle having an entrance chute that receives the package, an image sensor within the entrance chute, and an interaction sensor, the method comprising:

detecting, with the interaction sensor, when the package is provided to the logistics receptacle;

activating the image sensor, after detection by the interaction sensor, to capture a first package exterior image corresponding to at least a part of one side of the package;

processing the captured first package exterior image to determine a pattern match related to the package type of the package; and identifying the package type for the package based upon the determined pattern match.

2. The method of claim 1, wherein the step of detecting further comprises detecting, with the interaction sensor, when the package has been received within the entrance chute.

3. The method of claim 1, wherein the step of detecting further comprises detecting, with the interaction sensor, when the entrance chute is repositioned to deposit the package within a holding area of the logistics receptacle.

4. The method of claim 1, wherein the step of detecting further comprises detecting a depositing motion of the package by the interaction sensor.

5. The method of claim 4, wherein the depositing motion of the package detected by the interaction sensor corresponds to at least one of an insertion motion of the package through the entrance chute or a tilting motion of the package relative to the logistics receptacle.

6. The method of claim 1, wherein the image sensor comprises a scanning image sensor in substantially close contact with at least part of the package when the package is placed within the entrance chute of the logistics receptacle.

7. The method of claim 1, wherein the image sensor comprises a plurality of surface image sensors, wherein each of the surface image sensors is disposed about the entrance chute of the logistics receptacle to capture a different exterior image of the package as the package moves through the entrance chute when being deposited into a holding area of the logistics receptacle;

wherein the activating step further comprises activating each of the surface image sensors to respectively capture a plurality of exterior images respectively corresponding to at least a portion of a plurality of surfaces of the package; and wherein the processing step further comprises processing the captured plurality of exterior images to determine the pattern match.

8. The method of claim 7, wherein one of the plurality of surface image sensors comprises a top surface image sensor disposed within the entrance chute, the top surface image sensor not being in substantially close contact with the package, wherein the top surface image sensor operating, when activated, to capture an image of at least a portion of a top exterior surface of the package as the package moves through the entrance chute when being deposited into the holding area of the logistics receptacle.

9. The method of claim 8, wherein the top surface image sensor, when activated, captures the image of at least the portion of the top exterior surface of the package using a plurality of focus zones to capture differently focused images of the top exterior surface of the package as the image of the top exterior surface of the package as the package moves through the entrance chute when being deposited into the holding area of the logistics receptacle.

10. The method of claim 1, wherein the step of processing further comprises analyzing the captured first package exterior image to distinguish whether a recognized pattern matches one of a set of categories respectively associated with different package types when determining the pattern match.

11. The method of claim 1, wherein the step of processing further comprises:
combining the first captured package exterior image with a second captured package exterior image, the first captured package exterior image corresponding to a first part of one side of the package and the second captured package exterior image corresponding to a second part of one side of the package; and
analyzing the combined first and second captured package exterior images to distinguish whether a recognized pattern matches one of a set of categories respectively associated with different package types when determining the pattern match.

12. The method of claim 1, wherein the step of processing further comprises:
generating a composite image of at least the part of the one side of the package, wherein the composite image comprises a combination of different captured package exterior images respectively representing different sections of the part of the one side of the package; and
analyzing the composite image to distinguish whether a recognized pattern matches one of a set of categories respectively associated with different package types when determining the pattern match.

13. The method of claim 1, wherein the step of activating further comprises selectively activating the image sensor, upon detection by the interaction sensor, based upon whether a threshold number of different types of packages have been previously identified.

14. The method of claim 1 further comprising the step of transmitting a pickup request message, the pickup request message being related to the identified package type.

15. The method of claim 1 further comprising the step of transmitting a pickup request message when a threshold number of different types of packages have been identified.

16. A non-transitory computer-readable medium containing instructions which when executed on a processor performs a method for detecting a package type of a package deposited within an logistics receptacle having an entrance chute that receives the package, an image sensor within the entrance chute, and an interaction sensor, the method comprising:
receiving a detection indication from the interaction sensor when the package is provided to the logistics receptacle;
activating the image sensor after receiving the detection signal from the interaction sensor;
receiving a first package exterior image captured by the activated image sensor, the first package exterior image corresponding to at least a part of one side of the package;
processing the captured first package exterior image to determine a pattern match related to the package type of the package; and
identifying the package type for the package based upon the determined pattern match.

17. The non-transitory computer-readable medium of claim 16, wherein the detection indication corresponds to when the package has been received within the entrance chute.

18. The non-transitory computer-readable medium of claim 16, wherein the detection indication corresponds to when the entrance chute is repositioned to deposit the package within a holding area of the logistics receptacle.

19. The non-transitory computer-readable medium of claim 16, wherein the detection indication corresponds to detection of a depositing motion of the package by the interaction sensor.

20. The non-transitory computer-readable medium of claim 19, wherein the depositing motion of the package detected by the interaction sensor corresponds to at least one of an insertion motion of the package through the entrance chute or a tilting motion of the package relative to the logistics receptacle.

21. The non-transitory computer-readable medium of claim 16, wherein the image sensor comprises a scanning image sensor in substantially close contact with at least part of the package when the package is placed within the entrance chute of the logistics receptacle.

22. The non-transitory computer-readable medium of claim 16, wherein the image sensor comprises a plurality of surface image sensors, wherein each of the surface image sensors is disposed about the entrance chute of the logistics receptacle to capture a different exterior image of the package as the package moves through the entrance chute when being deposited into a holding area of the logistics receptacle;
wherein the activating step further comprises activating each of the surface image sensors to respectively capture a plurality of exterior images respectively corresponding to at least a portion of a plurality of surfaces of the package; and
wherein the processing step further comprises processing the captured plurality of exterior images to determine the pattern match.

23. The non-transitory computer-readable medium of claim 22, wherein one of the plurality of surface image sensors comprises a top surface image sensor disposed within the entrance chute, the top surface image sensor not being in substantially close contact with the package, wherein the top surface image sensor, when activated, operating to capture an image of at least a portion of a top exterior surface of the package as the package moves through the entrance chute when being deposited into the holding area of the logistics receptacle.

24. The non-transitory computer-readable medium of claim 23, wherein the top surface image sensor, when activated, captures the image of at least the portion of the top exterior surface of the package using a plurality of focus zones to capture differently focused images of the top exterior surface of the package as the image of the top exterior surface of the package as the package moves through the entrance chute when being deposited into the holding area of the logistics receptacle.

25. The non-transitory computer-readable medium of claim 16, wherein the step of processing further comprises analyzing the captured first package exterior image to distinguish whether a recognized pattern matches one of a set of categories respectively associated with different package types when determining the pattern match.

26. The non-transitory computer-readable medium of claim 16, wherein the step of processing further comprises:
   combining the first captured package exterior image with a second captured package exterior image, the first captured package exterior image corresponding to a first part of one side of the package and the second captured package exterior image corresponding to a second part of one side of the package; and
   analyzing the combined first and second captured package exterior images to distinguish whether a recognized pattern matches one of a set of categories respectively associated with different package types when determining the pattern match.

27. The non-transitory computer-readable medium of claim 16, wherein the step of processing further comprises:
   generating a composite image of at least the part of the one side of the package, wherein the composite image comprises a combination of different captured package exterior images respectively representing different sections of the part of the one side of the package; and
   analyzing the composite image to distinguish whether a recognized pattern matches one of a set of categories respectively associated with different package types when determining the pattern match.

28. The non-transitory computer-readable medium of claim 16, wherein the step of activating further comprises selectively activating the image sensor, upon receiving the detection indication from the interaction sensor, based upon whether a threshold number of different types of packages have been previously identified.

29. The non-transitory computer-readable medium of claim 16 further comprising the step of transmitting a pickup request message, the pickup request message being related to the identified package type.

30. The non-transitory computer-readable medium of claim 16 further comprising the step of transmitting a pickup request message when a threshold number of different types of packages have been identified.

31. An apparatus for detecting a package type of a received package, the apparatus comprising:
   a logistics receptacle further comprising,
      a holding area within which to maintain the package, and
      an entrance chute through which the package may be deposited into the holding area, the entrance chute comprising at least a plurality of walls;
   an interaction sensor disposed on the logistics receptacle and operative to generate a detection signal when the package is provided to the logistics receptacle within the entrance chute;
   an image sensor disposed on at least one of the plurality of walls, wherein upon activation, the image sensor captures a first package exterior image corresponding to at least a part of one side of the package;
   a processing module disposed within the logistics receptacle, the processing module further comprising,
      a processing unit coupled to each of the interaction sensor and to the image sensor, and
      a memory coupled to the processing unit, the memory maintaining a set of graphic label category references respectively associated with different package types; and
   wherein the processing unit is adapted and operative to
      receive the detection signal from the interaction sensor,
      activate the image sensor to cause the image sensor to capture the first package exterior image upon receipt of the detection signal,
      receive the captured first package exterior image from the image sensor,
      determine a pattern match related to the package type of the package by analyzing the captured first package exterior image compared with respective ones of the set of graphic label category references, and
      identify the package type for the package based upon the determined pattern match.

32. The apparatus of claim 31, wherein the entrance chute further comprises an actuated drop chute comprising the plurality of walls and a pivoting rear door that opens only when the actuated drop chute is repositioned to deposit the package within the holding area.

33. The apparatus of claim 31, wherein the pivoting rear door opens when the actuated drop chute is repositioned to a desired angle that allows the package to slide through the actuated drop chute at a desired linear speed as the package passes near the image sensor.

34. The apparatus of claim 31, wherein the interaction sensor is operative to generate the detection signal when the package has been received within the entrance chute.

35. The apparatus of claim 32, wherein the interaction sensor is operative to generate the detection signal when the actuated drop chute is repositioned to deposit the package within the holding area.

36. The apparatus of claim 32, wherein the interaction sensor is operative to generate the detection signal upon detecting a depositing motion of the package.

37. The apparatus of claim 36, wherein the depositing motion of the package comprises at least one of an insertion motion of the package through the entrance chute or a tilting motion of the package relative to the logistics receptacle.

38. The apparatus of claim 31, wherein the image sensor comprises a scanning image sensor integrated as part of the entrance chute and in substantially close contact with at least a part of the package when the package is placed within the entrance chute of the logistics receptacle.

39. The apparatus of claim 31, wherein the image sensor comprises a plurality of surface image sensors, wherein each of the surface image sensors is disposed about the entrance chute to capture a different exterior image of the package as the package moves through the entrance chute when being deposited into a holding area of the logistics receptacle; and
   wherein the processing unit is further adapted and operative to
      activate each of the surface image sensors to respectively capture a plurality of exterior images respectively corresponding to at least a portion of a plurality of surfaces of the package, and
      analyze the captured plurality of exterior images to determine the pattern match.

40. The apparatus of claim 39, wherein one of the plurality of surface image sensors comprises a top surface image sensor disposed within the entrance chute, the top surface image sensor not being in substantially close contact with the package, wherein the top surface image sensor operating, when activated, to capture an image of at least a portion of a top exterior surface of the package as the package moves through the entrance chute when being deposited into the holding area of the logistics receptacle.

41. The apparatus of claim 39, wherein the top surface image sensor, when activated, captures the image of the top exterior surface of the package using a plurality of focus zones to capture differently focused images of at least a portion of the top exterior surface of the package as the image of the top exterior surface of the package as the package moves through the entrance chute when being deposited into the holding area of the logistics receptacle.

42. The apparatus of claim 41, wherein the processing unit is further adapted and operative to determine which of the differently focused images of the portion of the top exterior surface of the package is most in focus, and using the determined one of the differently focused images as the image of the top exterior surface of the package.

43. The apparatus of claim 31, wherein the processing unit being further adapted and operative upon receipt of the detection signal to selectively activate the image sensor based upon whether a threshold number of different types of packages have been previously identified.

44. The apparatus of claim 31, wherein the processing module further comprising a communication interface coupled to the processing unit, the communication unit being operative to transmit a message over a network; and
   wherein the processing unit is further adapted and operative to cause the communication interface to transmit a pickup request message as the message over the network, the pickup request message being related to the identified package type.

45. The apparatus of claim 44, wherein the processing unit is further adapted and operative to cause the communication interface to transmit the pickup request message when a threshold number of different types of packages have been identified.

46. A system for detecting a package type of a received package, the system comprising:
   a logistics receptacle further comprising,
      an entrance chute through which the package may be deposited, the entrance chute comprising at least a plurality of walls;
      an interaction sensor disposed on the logistics receptacle and operative to generate a detection signal when the package is provided to the logistics receptacle within the entrance chute;
      an image sensor disposed within the entrance chute, wherein upon activation, the image sensor being operative to capture a first package exterior image corresponding to at least a part of one side of the package;
   a processing module disposed within the logistics receptacle, the processing module further comprising,
      a receptacle processing unit coupled to each of the interaction sensor and to the image sensor,
      a first memory unit coupled to the receptacle processing unit, the first memory unit maintaining a set of graphic label category references respectively associated with different package types,
      a receptacle communication interface coupled to the receptacle processing unit, the receptacle communication interface providing access to a network;
   wherein the receptacle processing unit is adapted and operative to
      receive the detection signal from the interaction sensor,
      activate the image sensor to cause the image sensor to capture the first package exterior image upon receipt of the detection signal,
      receive the captured first package exterior image from the image sensor,
      analyze the captured first package exterior image compared with respective ones of the set of graphic label category references to recognize a pattern match related to the package type of the package,
      identify the package type for the package based upon the recognized pattern match, and
      cause the receptacle communication interface to transmit a pickup request message over the network, the pickup request message being related to the identified package type;
   a server further comprising,
      a server processing unit,
      a server memory unit coupled to the server processing unit, the server memory unit maintaining analytics information related to the logistics receptacle,
      a server communication interface coupled to the server processing unit, the server communication interface providing access to the network;
   wherein the server processing unit is adapted and operative to
      receive the pickup request from the server communication interface,
      update the analytics information related to the logistics receptacle,
      determine a future pickup schedule based upon the updated analytics information, and
      cause the server communication interface to transmit a schedule update message based upon the determined future pickup schedule.

47. The system of claim 46, wherein the image sensor comprises a plurality of surface image sensors, wherein each of the surface image sensors is disposed about the entrance chute to capture a different exterior image of the package as the package moves through the entrance chute when being deposited into a holding area of the logistics receptacle; and
   wherein the receptacle processing unit is further adapted and operative to
      activate each of the surface image sensors to respectively capture a plurality of exterior images respectively corresponding to a plurality of surfaces of the package, and
      analyze the captured plurality of exterior images to determine the pattern match.

48. The system of claim 46, wherein the receptacle processing unit being further adapted and operative upon receipt of the detection signal to selectively activate the image sensor based upon whether a threshold number of different types of packages have been previously identified.

49. The system of claim 46, wherein the analytics information comprises at least historic event information related to the logistics receptacle.

50. The system of claim 49, wherein the historic event information further comprises at least one of a prior detected package type for the logistics receptacle, time information related to a prior detected package type for the logistics receptacle, customer information related to a prior package picked up from the logistics receptacle, a pattern of customer interaction with the logistics receptacle, and logistics operational information for the logistics receptacle.

51. The system of claim 46, wherein the analytics information further comprises environmental information related to the location of the logistics receptacle.

52. The system of claim 51, wherein the environmental information further comprises at least one of demographics information related to the location of the logistics receptacle, crime information related to the location of the logistics receptacle, and weather information related to the location of the logistics receptacle.

\* \* \* \* \*